US 7,730,456 B2

(12) United States Patent
Okawa et al.

(10) Patent No.: US 7,730,456 B2
(45) Date of Patent: Jun. 1, 2010

(54) METHODS AND APPARATUS FOR HANDLING PROCESSING ERRORS IN A MULTI-PROCESSING SYSTEM

(75) Inventors: Yasukichi Okawa, Austin, TX (US); Daisuke Hiraoka, Austin, TX (US); Koji Hirairi, Austin, TX (US); Tatsuya Koyama, Austin, TX (US)

(73) Assignee: Sony Computer Entertainment Inc. (JP)

( * ) Notice: Subject to any disclaimer, the term of this patent is extended or adjusted under 35 U.S.C. 154(b) by 1061 days.

(21) Appl. No.: 10/849,623

(22) Filed: May 19, 2004

(65) Prior Publication Data

US 2005/0273652 A1     Dec. 8, 2005

(51) Int. Cl.
 G06F 9/44   (2006.01)
 G06F 9/46   (2006.01)
(52) U.S. Cl. ............................. 717/127; 718/105
(58) Field of Classification Search ......... 717/124–130, 717/148–150
 See application file for complete search history.

(56) References Cited

U.S. PATENT DOCUMENTS

| 5,535,393 | A | * | 7/1996 | Reeve et al. | 717/149 |
|---|---|---|---|---|---|
| 5,832,272 | A | * | 11/1998 | Kalantery | 717/149 |
| 5,867,712 | A | * | 2/1999 | Shaw et al. | 717/127 |
| 6,016,395 | A | * | 1/2000 | Mohamed | 717/149 |
| 6,256,775 | B1 | * | 7/2001 | Flynn | 717/127 |
| 6,266,804 | B1 | * | 7/2001 | Isman | 717/125 |
| 6,496,940 | B1 | * | 12/2002 | Horst et al. | 714/4 |
| 6,665,862 | B2 | * | 12/2003 | Isman | 717/127 |
| 6,671,830 | B2 | * | 12/2003 | Kaler et al. | 714/39 |
| 6,718,486 | B1 | | 4/2004 | Roselli et al. | |
| 6,772,322 | B1 | * | 8/2004 | Merchant et al. | 712/227 |
| 6,782,531 | B2 | * | 8/2004 | Young | 717/130 |
| 6,957,422 | B2 | * | 10/2005 | Hunt | 717/130 |

(Continued)

FOREIGN PATENT DOCUMENTS

JP     02-293059 A     11/1997

(Continued)

OTHER PUBLICATIONS

Ryou, J.-C, et al. "A Task Migration Algorithm For Load Balancing In A Distributed System", In: System Sciences, 1989. vol. II: Software Track, Proceedings, Annual Hawaii International Conference on, IEEE, Jan. 3-6, 1989. vol. 2, pp. 1041-1048.

(Continued)

*Primary Examiner*—Philip Wang
(74) *Attorney, Agent, or Firm*—Lerner, David, Littenberg, Krumholz & Mentlik, LLP

(57) ABSTRACT

Methods and apparatus are provided for: monitoring processor tasks and associated processor loads therefor that are allocated to be performed by respective sub-processing units associated with a main processing unit; detecting whether a processing error has occurred in a given one of the sub-processing units; re-allocating all of the processor tasks of the given sub-processing unit to one or more participating sub-processing units, including other sub-processing units associated with the main processing unit, based on the processor loads of the processor tasks of the given sub-processing unit and the processor loads of the participating sub-processing units; and at least one of: (i) shutting down, and (ii) re-booting the given sub-processing unit.

10 Claims, 23 Drawing Sheets

U.S. PATENT DOCUMENTS

| | | | |
|---|---|---|---|
| 7,086,035 B1* | 8/2006 | Mericas | 717/127 |
| 7,143,392 B2* | 11/2006 | Ii et al. | 717/125 |
| 7,293,260 B1* | 11/2007 | Dmitriev | 717/130 |
| 2003/0187915 A1* | 10/2003 | Sun et al. | 709/201 |
| 2003/0237018 A1* | 12/2003 | Baba | 714/4 |
| 2005/0060590 A1* | 3/2005 | Bradley et al. | 713/320 |
| 2005/0240735 A1* | 10/2005 | Shen et al. | 711/144 |
| 2005/0251667 A1* | 11/2005 | Iwamoto | 712/233 |

FOREIGN PATENT DOCUMENTS

| | | |
|---|---|---|
| JP | 2000-066776 A | 3/2000 |
| JP | 2001-306351 A | 11/2001 |
| JP | 2003-036249 A | 2/2003 |
| WO | WO-03/040947 A1 | 5/2003 |

OTHER PUBLICATIONS

PCT/ISA/210 International Search Reported dated Aug. 30, 2005.
PCT/ISA/220 Transmittal of ISR.
PCT/ISA/237 Written Opinion Of ISA.
Office Action from corresponding Japanese Application 2005-144793, dated Oct. 21, 2008.
Office Action from corresponding Canadian Application 2,530,942, dated Oct. 6, 2008.

* cited by examiner

| 602 | 604 | 606 | 608 | 610 | 612 |
|---|---|---|---|---|---|
| PERF. INFO. | COMM. INFO. | PD # | BD # | BE # | SPU # |
| 10 | 1 | 3 | 0 | 0 | 3 |
| 5 | 1 | 3 | 0 | 0 | 5 |
| 20 | 2 | 6 | 0 | 1 | 1 |
| 40 | 10 | 2 | 1 | 3 | 2 |

| | 602 | 604 | 614 | 616 | 606 | 608 | 610 | 612 |
|---|---|---|---|---|---|---|---|---|
| | PERF. INFO. | COM. INFO. | AVAIL. INFO. | COST INFO. | PD # | BD # | BE # | SPU # |
| | 10 | 1 | 90 | 3 | 3 | 0 | 0 | 3 |
| | 5 | 1 | 10 | 6 | 3 | 0 | 0 | 5 |
| | 20 | 2 | 30 | 7 | 6 | 0 | 1 | 1 |
| | 40 | 10 | 60 | 2 | 2 | 1 | 3 | 2 |

.

.

.

METHODS AND APPARATUS FOR HANDLING PROCESSING ERRORS IN A MULTI-PROCESSING SYSTEM

BACKGROUND OF THE INVENTION

The present invention relates to methods and apparatus for handling processor errors in a multi-processing system and, in particular, for re-allocating processor tasks among sub-processing units of the multi-processing system when a processor error occurs.

Real-time, multimedia applications are becoming increasingly important. These applications require extremely fast processing speeds, such as many thousands of megabits of data per second. While single processing units are capable of fast processing speeds, they cannot generally match the processing speeds of multi-processor architectures. Indeed, in multi-processor systems, a plurality of sub-processors can operate in parallel (or at least in concert) to achieve desired processing results.

The types of computers and computing devices that may employ multi-processing techniques are extensive. In addition to personal computers (PCs) and servers, these computing devices include cellular telephones, mobile computers, personal digital assistants (PDAs), set top boxes, digital televisions and many others.

A design concern in a multi-processing system is how to manage when one sub-processing unit exhibits a processing error. Indeed, a processing error could affect the overall performance of the multi-processing system and adversely impact the real-time, multimedia, experience by a user. This is particularly true when the result of one sub-processor is to be used by other sub-processing units in order to achieve a desired result.

Hard processor errors, such as error correction code (ECC) errors, parity errors, processor hang-ups, etc., may be characterized as fatal errors or recoverable errors. Fatal errors may occur due to operating system errors, kernel errors, etc., while recoverable errors generally do not involve operating system errors or kernel errors. When a recoverable error occurs, it would be desirable to be able to continue executing the processor tasks without violating any real-time processing deadlines or processing requirements, such as would be the case when recovery would require having to re-boot a given sub-processor and re-execute the processor tasks from the beginning. Until the present invention, this has not been possible.

Therefore, there is a need in the art for new methods and apparatus for achieving efficient multi-processing that reduces the adverse affects of hard processor errors.

SUMMARY OF THE INVENTION

In accordance with one or more aspects of the present invention, a method includes: monitoring processor tasks and associated processor loads therefor that are allocated to be performed by respective sub-processing units associated with a main processing unit; detecting whether a processing error has occurred in a given one of the sub-processing units; and re-allocating all of the processor tasks of the given sub-processing unit to one or more participating sub-processing units, including other sub-processing units associated with the main processing unit, based on the processor loads of the processor tasks of the given sub-processing unit and the processor loads of the participating sub-processing units. The method may also include at least one of: (i) shutting down, and (ii) re-booting the given sub-processing unit.

The method may further include: assigning the processor tasks among the sub-processing units such that at least one of the sub-processing units is substantially unloaded and available to receive some or all of the processor tasks from the given sub-processing unit. Further, the method may include commanding the one or more unloaded sub-processing units that are not scheduled to perform any processor tasks into a stand-by state (which may be a low power consumption state).

In accordance with further embodiments of the present invention, the participating sub-processing units may include one or more respective groups of sub-processing units, each group being associated with a respective main processing unit. Each of the respective groups of sub-processing units and the associated main processing unit may be part of a set of multi-processing units, wherein the respective group of sub-processing units and the main processing unit share a common data bus with one or more others of the respective groups of sub-processing units and associated main processing units.

Alternatively or in addition, each of the respective groups of sub-processing units and the associated main processing unit may be a stand alone multi-processing unit, wherein the respective group of sub-processing units and the main processing unit does not share a common data bus with any other group of sub-processing units and associated main processing unit. Further, each of the respective groups of sub-processing units and the associated main processing unit may be at least part of a distributed multi-processing unit, wherein at least some of the main processing unit and the sub-processing units are remotely located from one another.

The multi-processing units, stand alone multi-processing units, and distributed multi-processing units may be disposed at least one of: (i) on common or different circuit boards; (ii) in common or different products; and (iii) in common or different locations.

In this regard, the method may include: determining communications requirements, including communication bandwidth and communication latency, needed between the given sub-processing unit and one or more sub-processing units to share processing results with the given sub-processing unit. Thereafter, the method may include basing the re-allocation of the tasks of the given sub-processing unit further on the communications requirements.

The method may further include: determining communications costs, including communication bandwidth and communication latency, that would exist between the one or more sub-processing units to share processing results with the given sub-processing unit and the one or more participating sub-processing units to which the processor tasks may be re-allocated. Thus, the re-allocation of the tasks of the given sub-processing unit may be further based on a comparison of the communications requirements and the communications costs.

Preferably, the communications requirements and the communications costs include at least one of: (i) a bandwidth and latency of one or more data communication interfaces between two sub-processing units on a common circuit board; (ii) a bandwidth and latency of one or more data communication interfaces between two sub-processing units on different circuit boards; (iii) a bandwidth and latency of one or more data communication interfaces between two sub-processing units in a common product; (iv) a bandwidth and latency of one or more data communication interfaces between two sub-processing units in different products; (v) a bandwidth and latency of one or more data communication interfaces between two sub-processing units in different products at a common location; and (vi) a bandwidth and latency of one or more data communication interfaces between two sub-processing units in different products, each at different locations.

In accordance with further embodiments of the invention, at least one of the multi-processing units and the stand alone multi-processing units may be in communication with an administrative entity. The administrative entity preferably includes a table containing at least one of: (i) performance information indicative of the processor loads for the participating sub-processing units; (ii) location information indicative of where the participating sub-processing units are disposed among the multi-processing units and the stand alone multi-processing units; and (iii) communication information indicative of communication bandwidth and communication latency that would exist between one of the participating sub-processing units to which the processor tasks may be re-allocated and the one or more sub-processing units to share processing results with the given sub-processing unit.

In this regard, the method preferably includes: using the table to determine which of the participating sub-processing units should be re-allocated with the processor tasks of the given sub-processing unit. The method also preferably includes: updating the table in response to any changes in processor loads, location, communication bandwidth, or communication latency among the participating sub-processing units.

In accordance with further embodiments of the invention, the method may include: sending a query from the main processing unit associated with the given sub-processing unit to the administrative entity, the query including at least one of: (i) the processor loads of the processor tasks of the given sub-processing unit, (ii) the location of the given sub-processing unit, and (iii) the communications requirement of the given sub-processing unit.

Additionally, the method may further include: matching at least one of the processor loads of the processor tasks, the location, and the communications requirement of the given sub-processing unit to at least one of the performance information, location information, and communication information of the table to determine which of the participating sub-processing units should be re-allocated with the processor tasks of the given sub-processing unit.

In accordance with one or more further aspects of the present invention, the methods and apparatus of the present invention may be used to obtain lease fees for using the participating sub-processing units. To this end, at least one of the multi-processing units, the stand alone multi-processing units, the distributed multi-processing units may be in communication with an administrative entity, the administrative entity including a table containing at least one of: (i) availability information indicative of at least one of processing power of participating sub-processing units that may be leased for use, and performance information indicative of processor loads for such participating sub-processing units; (ii) cost information indicative of respective fees for using the participating sub-processing units that may be leased; (iii) location information indicative of where the participating sub-processing units that may be leased are disposed among the multi-processing units, the stand alone multi-processing units and the distributed multi-processing units; and (iv) communication information indicative of communication bandwidth and communication latency that would exist between one of the participating sub-processing units for lease to which the processor tasks may be re-allocated and the one or more sub-processing units to share processing results with the given processing unit.

The table may be updated in response to any changes in availability information, cost information, location information, or communication information among the participating sub-processing units for lease. Preferably, the table is used to determine which of the participating sub-processing units for lease should be re-allocated with the processor tasks of the given sub-processing unit.

A query may be sent from the main processing unit associated with the given sub-processing unit to the administrative entity, the query including at least one of: (i) the processor load of the given sub-processing unit, (ii) the location of the given sub-processing unit, (iii) lease information indicating an acceptable cost to lease processing power from one or more of the participating sub-processing units for lease, and (iv) the communications requirement.

Preferably, at least one of the processor load, the acceptable cost, the location, and the communications requirement of the query is matched to at least one of the availability information, cost information, location information, and communication information of the table to determine which of the participating sub-processing units for lease should be re-allocated with the processor tasks of the given sub-processing unit. The participating sub-processing units for lease are preferably associated with one or more entities that may collect fees for the use of thereof when re-allocated with the processor tasks of the given sub-processing unit.

Alternatively, the processor load, the acceptable cost, the location, and the communications requirement of the query may be matched to the availability information, cost information, location information, and communication information of the table such that one or more of the participating sub-processing units for lease with the lowest fee may be re-allocated with the processor tasks of the given sub-processing unit. The participating sub-processing units for lease may be associated with one or more entities that may collect fees for the use of thereof when re-allocated with the processor tasks of the given sub-processing unit.

In accordance with one or more further aspects of the present invention, processor-to-processor communication and transfer may be achieved without an administrative entity. To this end, one or more requests for response from the main processing unit associated with the given sub-processing unit may be issued to one or more of the participating sub-processing units; communications information may be accumulated in one or more of the requests for response, the communications information being indicative of at least one of communications latencies and communications bandwidths associated with any communications interfaces encountered by the respective requests for response as they travel from the main processing unit to the one or more of the participating sub-processing units; and computing at least an estimate of the communications costs that would exist between the one or more sub-processing units to share processing results with the given sub-processing unit and the one or more participating sub-processing units to which the processor tasks may be re-allocated based on the accumulated communications information may be computed.

Preferably, the one or more requests for response are in the form of network data packets capable of transmission over a communications network. The communications network may be at least one of the Internet and any other networks in communication therewith.

One or more responses are preferably received at the main processing unit from one or more of the participating sub-processing units; and the processor tasks of the given sub-processing unit are preferably re-allocated to one or more of the participating sub-processing units that responded to the requests for response.

The one or more responses are also preferably in the form of network data packets capable of transmission over a communications network.

Communications costs of uplink data paths from the given sub-processing unit to the one or more participating sub-processing units that responded to the requests for response, are preferably computed. Preferably, such computation includes at least one of: (i) adding, for each uplink data path, communications latencies associated with the respective communications interfaces encountered by the request for response for each uplink data path as it travels from the main processing unit to the respective one of the participating sub-processing units, thereby obtaining an aggregate uplink communication latency for each uplink data path; and (ii) comparing, for each uplink data path, communications bandwidths associated with the respective communications interfaces encountered by the request for response for each uplink data path as it travels from the main processing unit to the respective one of the participating sub-processing units, to obtain a lowest communications bandwidth for each uplink data path.

The processor tasks of the given sub-processing unit are preferably reallocated to one or more of the participating sub-processing units that responded to the requests for response based on a comparison of the communications requirements and at least one of the aggregate uplink communication latency and the lowest communications bandwidth for each uplink data path.

Further communications information is preferably also accumulated in one or more of the responses, the further communications information indicative of at least one of communications latencies and communications bandwidths associated with any communications interfaces encountered by the respective responses as they travel from the one or more participating sub-processing units to the main processing unit; and computing the communications costs are preferably computed based on the accumulated communications information and the accumulated further communications information.

Each of the responses may include both the accumulated communications information along with the respective accumulated further communications information, such that the accumulated communications information and the accumulated further communications information is available to the main processing unit that issued the one or more requests for response.

Communications costs of uplink data paths and downlink data paths between the given sub-processing unit and the one or more participating sub-processing units that responded to the requests for response may also be computed. Preferably, such computation includes at least one of: (i) adding, for each uplink data path, communications latencies associated with the respective communications interfaces encountered by the request for response for each uplink data path as it travels from the main processing unit to the respective one of the participating sub-processing units, thereby obtaining an aggregate uplink communication latency for each uplink data path; (ii) comparing, for each uplink data path, communications bandwidths associated with the respective communications interfaces encountered by the request for response for each uplink data path as it travels from the main processing unit to the respective one of the participating sub-processing units, to obtain a lowest communications bandwidth for each uplink data path; (iii) adding, for each downlink data path, communications latencies associated with the respective communications interfaces encountered by the response for each downlink data path as it travels from the respective one of the participating sub-processing units to the main processing unit, thereby obtaining an aggregate downlink communication latency for each downlink data path; and (iv) comparing, for each downlink data path, communications bandwidths associated with the respective communications interfaces encountered by the response for each downlink data path as it travels from the respective one of the participating sub-processing units to the main processing unit, to obtain a lowest communications bandwidth for each downlink data path.

The processor tasks of the given sub-processing unit may then be re-allocated to one or more of the participating sub-processing units that responded to the requests for response based on a comparison of the communications requirements and at least one of the aggregate uplink communication latency for each uplink data path, the aggregate downlink communication latency for each downlink data path, the lowest communications bandwidth for each uplink data path, and the lowest communications bandwidth for each downlink data path.

One or more requests for response may be issued from the main processing unit to the one or more sub-processing units to share processing results with the given sub-processing unit. Further communications information indicative of at least one of communications latencies and communications bandwidths associated with any communications interfaces encountered by the respective requests for response is preferably accumulated as they travel from the main processing unit to the one or more of the sub-processing units to share processing results with the given sub-processing unit. The communications costs may then be computed based on any differences between the accumulated communications information and the accumulated further communications information.

Communications costs of uplink data paths and downlink data paths between the given sub-processing unit and the one or more participating sub-processing units that responded to the requests for response, and between the given sub-processing unit and the one or more sub-processing units to share processing results with the given sub-processing unit are preferably computed. Preferably, such computation includes at least one of: (i) adding, for each uplink data path, communications latencies associated with the respective communications interfaces encountered by the request for response for each uplink data path as it travels from the main processing unit to the respective one of the participating sub-processing units, and/or to the one or more sub-processing units to receive the results of the processor tasks of the given sub-processing unit, thereby obtaining an aggregate uplink communication latency for each uplink data path; (ii) comparing, for each uplink data path, communications bandwidths associated with the respective communications interfaces encountered by the request for response for each uplink data path as it travels from the main processing unit to the respective one of the participating sub-processing units, and/or to the one or more sub-processing units to receive the results of the processor tasks of the given sub-processing unit, to obtain a lowest communications bandwidth for each uplink data path; (iii) adding, for each downlink data path, communications latencies associated with the respective communications interfaces encountered by the response for each downlink data path as it travels from the respective one of the participating sub-processing units, and/or from the one or more sub-processing units to receive the results of the processor tasks of the given sub-processing unit, to the main processing unit, thereby obtaining an aggregate downlink communication latency for each downlink data path; and (iv) comparing, for each downlink data path, communications bandwidths associated with the respective communications interfaces encountered by the response for each downlink data path as it travels from the respective one of the participating sub-processing units, and/or from the one or more sub-processing units to receive the results of the processor tasks of the given sub-processing unit, to the main processing unit, to obtain a lowest communications bandwidth for each downlink data path.

The processor tasks of the given sub-processing unit may then be re-allocated to one or more of the participating sub-processing units that responded to the requests for response based on a comparison of the communications requirements and at least one of the aggregate uplink communication latency for each uplink data path, the aggregate downlink communication latency for each downlink data path, the lowest communications bandwidth for each uplink data path, and the lowest communications bandwidth for each downlink data path.

A reservation request may be issued from the main processing unit associated with the given sub-processing unit to one or more bus arbiters associated with communications busses between the given sub-processing unit and the one or more participating sub-processing units to which the processor tasks of the given sub-processing unit are to be re-allocated, wherein the reservation request causes the one or more bus arbiters to reserve communications bandwidth for the purpose of at least one of: (i) carrying out the re-allocated processor tasks, and (ii) transmitting results of the processor tasks to one or more other sub-processing units to receive such results. Thereafter, a reservation clear request from the main processing unit associated with the given sub-processing unit to the one or more bus arbiters may be issued, wherein the reservation clear request causes the one or more bus arbiters to clear the reservation of communications bandwidth.

The responses preferably include at least one of the accumulated information, and performance information indicative of respective processor loads for the participating sub-processing units issuing responses. Thus, one or more of the participating sub-processing units may be selected for re-allocation of the processor tasks of the given sub-processing unit based on a comparison of the processor loads of the processor tasks of the given sub-processing unit, the respective processor loads for the participating sub-processing units issuing responses, the communications requirements, and the accumulated information.

In accordance with one or more further aspects of the present invention, an apparatus includes: a plurality of sub-processing units, each operable to perform processor tasks; and a main processing unit. The main processing unit is operable to: (i) monitor the processor tasks and associated processor loads therefor that are allocated to be performed by the respective sub-processing units; (ii) detect whether a processing error has occurred in a given one of the sub-processing units; (iii) re-allocate all of the processor tasks of the given sub-processing unit to one or more participating sub-processing units, including other sub-processing units associated with the main processing unit, based on the processor loads of the processor tasks of the given sub-processing unit and the processor loads of the participating sub-processing units.

The main processing unit may be further operable to: (iv) at least one of issue a shut-down command and issue a re-boot command to the given sub-processing unit.

The main processing unit may be remotely located form or locally located with one or more of the sub-processing units. Further, one or more of the sub-processing units may be remotely located from one another. In addition, the sub-processing units may employ substantially heterogeneous computer architectures or a homogenous computer architecture.

The main processing unit is preferably further operable to assign the processor tasks among the sub-processing units such that at least one of the sub-processing units is substantially unloaded and available to receive some or all of the processor tasks from the given sub-processing unit. Additionally, the main processing unit may be further operable to command the one or more unloaded sub-processing units that are not scheduled to perform any processor tasks into a stand-by state (which may be a low power consumption state).

By way of example, the sub-processing units may include at least one of: (i) a power supply interrupt circuit; and (ii) a clock interrupt circuit, each of which are operable to place the given sub-processing unit into the stand-by state in response to the power-off command. Each of the sub-processing units preferably includes a power supply and the power supply interrupt circuit. The power supply interrupt circuit is preferably operable to shut down the power supply in response to the power-off command to place the given sub-processing unit into the stand-by state.

The apparatus also preferably includes: one or more respective groups of sub-processing units, each group being associated with a respective main processing unit. The participating sub-processing units may include one or more of the respective groups of sub-processing units.

Each of the respective groups of sub-processing units and the associated main processing unit may be part of a set of multi-processing units, wherein the respective group of sub-processing units and the main processing unit share a common data bus with one or more others of the respective groups of sub-processing units and associated main processing units. Additionally, or in the alternative, each of the respective groups of sub-processing units and the associated main processing unit may be a stand alone multi-processing unit, wherein the respective group of sub-processing units and the main processing unit does not share a common data bus with any other group of sub-processing units and associated main processing unit. Further, each of the respective groups of sub-processing units and the associated main processing unit may be at least part of a distributed multi-processing unit, wherein at least some of the main processing unit and the sub-processing units are remotely located from one another.

The multi-processing units, the stand alone multi-processing units, and the distributed multi-processing units may be disposed at least one of: (i) on common or different circuit boards; (ii) in common or different products; and (iii) in common or different locations.

The main processing unit is further operable to determine communications requirements, including communication bandwidth and communication latency, needed between the given sub-processing unit and one or more sub-processing units to share processing results with the given sub-processing unit. The main processing unit may be further operable to base the re-allocation of the tasks of the given sub-processing unit on the communications requirements.

Still further, the main processing unit may be operable to determine communications costs, including communication bandwidth and communication latency, that would exist between the one or more sub-processing units to share processing results with the given sub-processing unit and the one or more participating sub-processing units to which the processor tasks may be re-allocated. The main processing unit may also be operable to base the re-allocation of the tasks of the given sub-processing unit on a comparison of the communications requirements and the communications costs.

As with the methods of the invention, the communications requirements and the communications costs may include at least one of: (i) a bandwidth and latency of one or more data communication interfaces between two sub-processing units on a common circuit board; (ii) a bandwidth and latency of one or more data communication interfaces between two sub-processing units on different circuit boards; (iii) a bandwidth and latency of one or more data communication interfaces between two sub-processing units in a common product; (iv) a bandwidth and latency of one or more data communication interfaces between two sub-processing units in different products; (v) a bandwidth and latency of one or more data communication interfaces between two sub-processing units in different products at a common location; and (vi) a bandwidth and latency of one or more data communication interfaces between two sub-processing units in different products, each at different locations.

Further, the one or more data communication interfaces between the two sub-processing units include at least one of: (i) an intra sub-processing unit input/output bus interface; (ii) an inter sub-processing unit input/output bus interface; (iii) a switched fabric interconnect; (iv) a network interface card; and (v) a data network.

The apparatus also preferably includes an administrative entity in communication with at least one of the multi-processing units and the stand alone multi-processing units. The administrative entity preferably includes a table containing at least one of: (i) performance information indicative of the processor loads for the participating sub-processing units; (ii) location information indicative of where the participating sub-processing units are disposed among the multi-processing units and the stand alone multi-processing units; and (iii) communication information indicative of communication bandwidth and communication latency that would exist between one of the participating sub-processing units to which the processor tasks may be re-allocated and the one or more sub-processing units to share processing results with the given sub-processing unit.

The administrative entity is preferably operable to update the table in response to any changes in processor loads of the processor tasks, locations, communication bandwidth, or communication latency among the participating sub-processing units. The administrative entity is also preferably operable to use the table to determine which of the participating sub-processing units should be re-allocated with the processor tasks of the given sub-processing unit.

The main processing unit associated with the given sub-processing unit is preferably operable to send a query to the administrative entity, the query including at least one of: (i) the processor loads of the processor tasks of the given sub-processing unit, (ii) the location of the given sub-processing unit, and (iii) the communications requirement of the given sub-processing unit.

The administrative entity is also preferably operable to match at least one of the processor loads of the processor tasks, the location, and the communications requirement of the given sub-processing unit to at least one of the performance information, location information, and communication information of the table to determine which of the participating sub-processing units should be re-allocated with the processor tasks of the given sub-processing unit.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

FIG. 17 is a diagram illustrating a table containing processor load information, location information and communication information concerning the sub-processing units of the multi-processing system in accordance with the present invention;

FIG. 19 is a diagram illustrating a table similar to that of FIG. 17 except also including information indicative of available processing power for lease, and cost information indicative of a fee for leasing such processing power;

DETAILED DESCRIPTION OF THE PREFERRED EMBODIMENTS

Figure 1:
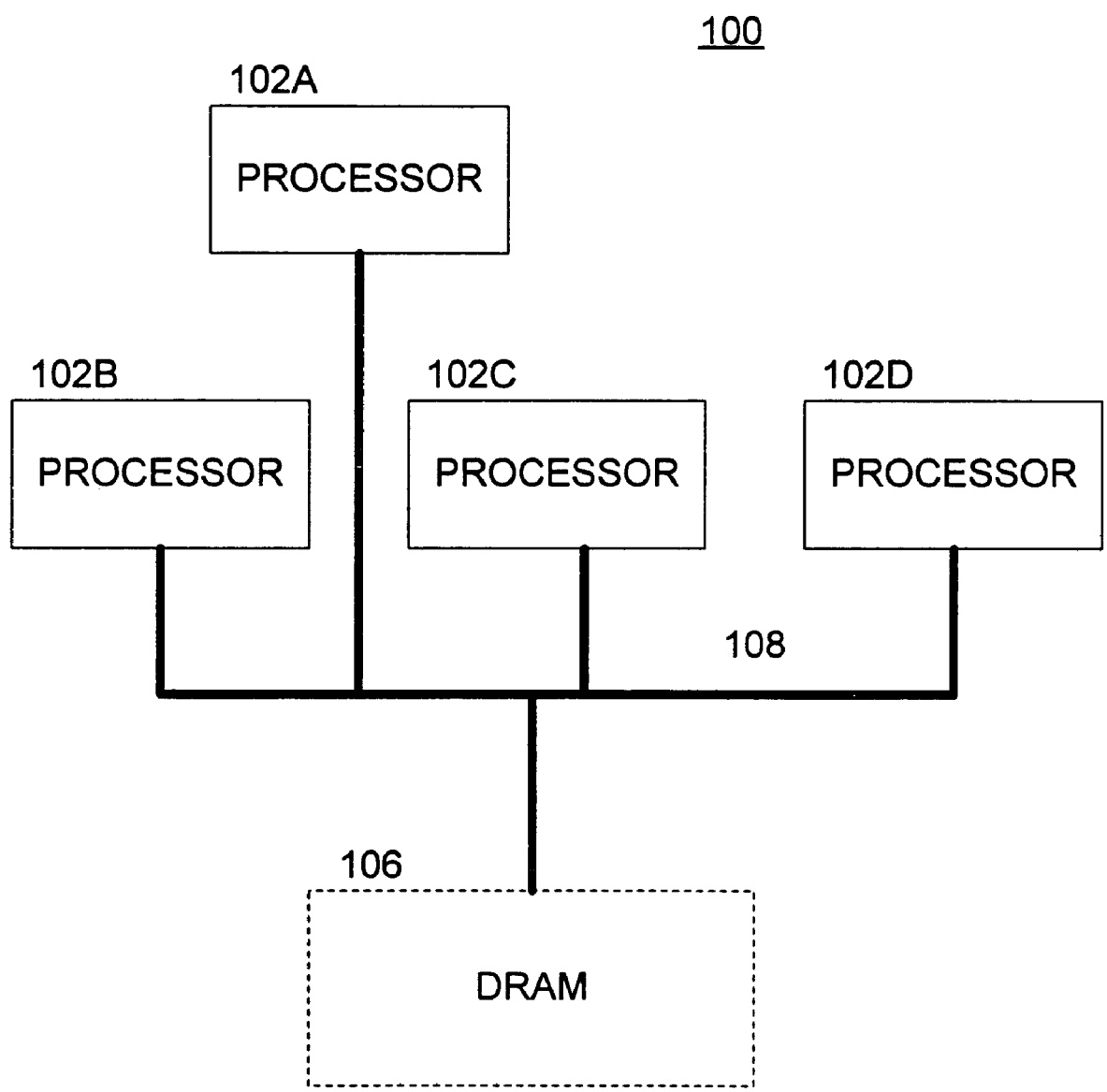
FIG. 1 is a diagram illustrating the structure of a multi-processing system in accordance with one or more aspects of the present invention.

With reference to the drawings, where like numerals indicate like elements, there is shown in FIG. 1 a multi-processing system 100 in accordance with the present invention. The multi-processing system 100 includes a plurality of processors 102 (any number may be used) coupled to a shared memory 106, such as a DRAM, over a bus 108. It is noted that the shared DRAM memory 106 is not required (and thus is shown in dashed line). Indeed, one or more of the processing units 102 may employ its own memory (not shown) and have no need for the shared memory 106.

One of the processors 102 is preferably a main processing unit, for example, processing unit 102A. The other processing units 102 are preferably sub-processing units (SPUs), such as processing unit 102B, 102C, 102D, etc. The processing units 102 may be implemented using any of the known computer architectures. All of the processing units 102 need not be implemented using the same architecture; indeed they may be of heterogeneous or homogenous configurations. In operation, the main processing unit 102A preferably schedules and orchestrates the processing of data and applications by the sub-processing units 102B-D such that the sub-processing units 102B-D perform the processing of these data and applications in a parallel and independent manner.

It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

From time to time, one or more of the sub-processing units 102B-D may exhibit a hard processor error, for example, a recoverable error that does not involve operating system errors or kernel errors. To this end, the main processing unit 102A is preferably operable to perform other managerial functions that permit the continuation of executing the processor tasks without having to re-execute the processor tasks that have been executed by the sub-processing unit 102B-D (prior to the error) from the beginning. Preferably, the managerial functions of the main processing unit 102A operate to ensure that real-time (and/or multi-media) processing objectives are met even in the event of a recoverable error in one or more of the sub-processing units 102B-D.

These further managerial functions include monitoring the processor tasks (and/or the associated processor loads for those tasks) that are allocated to be performed by the respective sub-processing units 102B-D. The main processing unit 102A may also detect whether a processing error has occurred in a given one of the sub-processing units, and re-allocate all of the processor tasks of the given sub-processing unit to one or more participating sub-processing units. This re-allocation is preferably carried out based on the processor loads of the processor tasks of the given sub-processing unit and the processor loads of the participating sub-processing units. These and other aspects of the present invention will be discussed in more detail later in this description.

Prior to discussing further details regarding the re-allocation feature of the present invention, a description of a preferred computer architecture will now be provided. In accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

The basic processing module is a processor element (PE). In this regard, reference is made to FIG. 2, which is block diagram of a basic processing module or processor element (PE) 200. As shown in this figure, PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, the sub-processing units 208, the DMAC 206, and a memory interface 210. The local PE bus 212 can have, e.g., a conventional architecture or can be implemented as a packet switch network. Implementation as a packet switch network, while requiring more hardware, increases available bandwidth.

The PE 200 can be constructed using various methods for implementing digital logic. The PE 200 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 200 also could be implemented using superconducting material, e.g., rapid single-flux-quantum (RSFQ) logic.

The PE 200 is closely associated with a dynamic random access memory (DRAM) 214 through a high bandwidth memory connection 216. The DRAM 214 functions as the main memory for the PE 200. Although the DRAM 214 preferably is a dynamic random access memory, the DRAM 214 could be implemented using other means, e.g., as a static random access memory (SRAM), a magnetic random access memory (MRAM), an optical memory, a holographic memory, etc. The DMAC 206 and the memory interface 210 facilitate the transfer of data between the DRAM 214 and the sub-processing units 208 and the PU 204 of the PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204. Thus, the DMAC 206 is shown in dashed lines.

The PU 204 can be, e.g., a standard processor capable of stand-alone processing of data and applications. In operation, the PU 204 schedules and orchestrates the processing of data and applications by the sub-processing units. The sub-processing units preferably are single instruction, multiple data (SIMD) processors. Under the control of the PU 204, the sub-processing units perform the processing of these data and applications in a parallel and independent manner. The DMAC 206 controls accesses by the PU 204 and the sub-processing units 208 to the data and applications stored in the shared DRAM 214. It is noted that the PU 204 may be implemented by one of the sub-processing units 208 taking on the role of a main processing unit that schedules and orchestrates the processing of data and applications by the sub-processing units 208.

In accordance with this modular structure, the number of PEs 200 employed by a particular computer system is based upon the processing power required by that system. For example, a server may employ four PEs 200, a workstation may employ two PEs 200 and a PDA may employ one PE 200. The number of sub-processing units of a PE 200 assigned to processing a particular software cell depends upon the complexity and magnitude of the programs and data within the cell.

Figure 3:
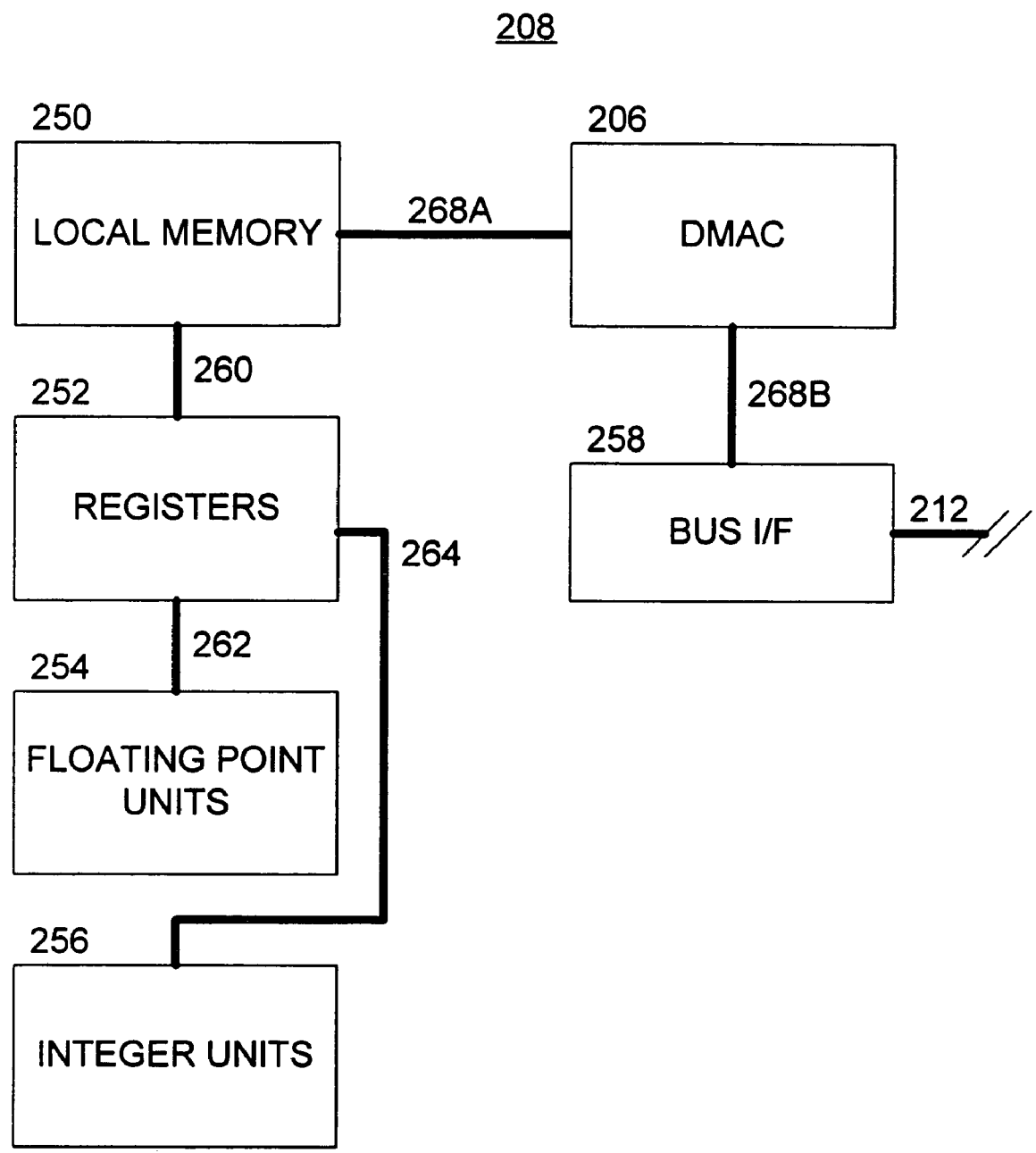
FIG. 3 is a diagram illustrating the structure of an exemplary sub-processing unit (SPU) in accordance with the present invention.

FIG. 3 illustrates the preferred structure and function of a sub-processing unit 208. The sub-processing unit 208 includes local memory 250, registers 252, one ore more floating point units 254 and one or more integer units 256. Again, however, depending upon the processing power required, a greater or lesser number of floating points units 254 and integer units 256 may be employed. In a preferred embodiment, the local memory 250 contains 256 kilobytes of storage, and the capacity of registers 252 is 128×128 bits. The floating point units 254 preferably operate at a speed of 32 billion floating point operations per second (32 GFLOPS), and the integer units 256 preferably operate at a speed of 32 billion operations per second (32 GOPS).

The local memory 250 may or may not be a cache memory. The local memory 250 is preferably constructed as a static random access memory (SRAM). A PU 204 may require cache coherency support for direct memory accesses initiated by the PU 204. Cache coherency support is not required, however, for direct memory accesses initiated by the sub-processing units 208 or for accesses from and to external devices.

Figure 2:
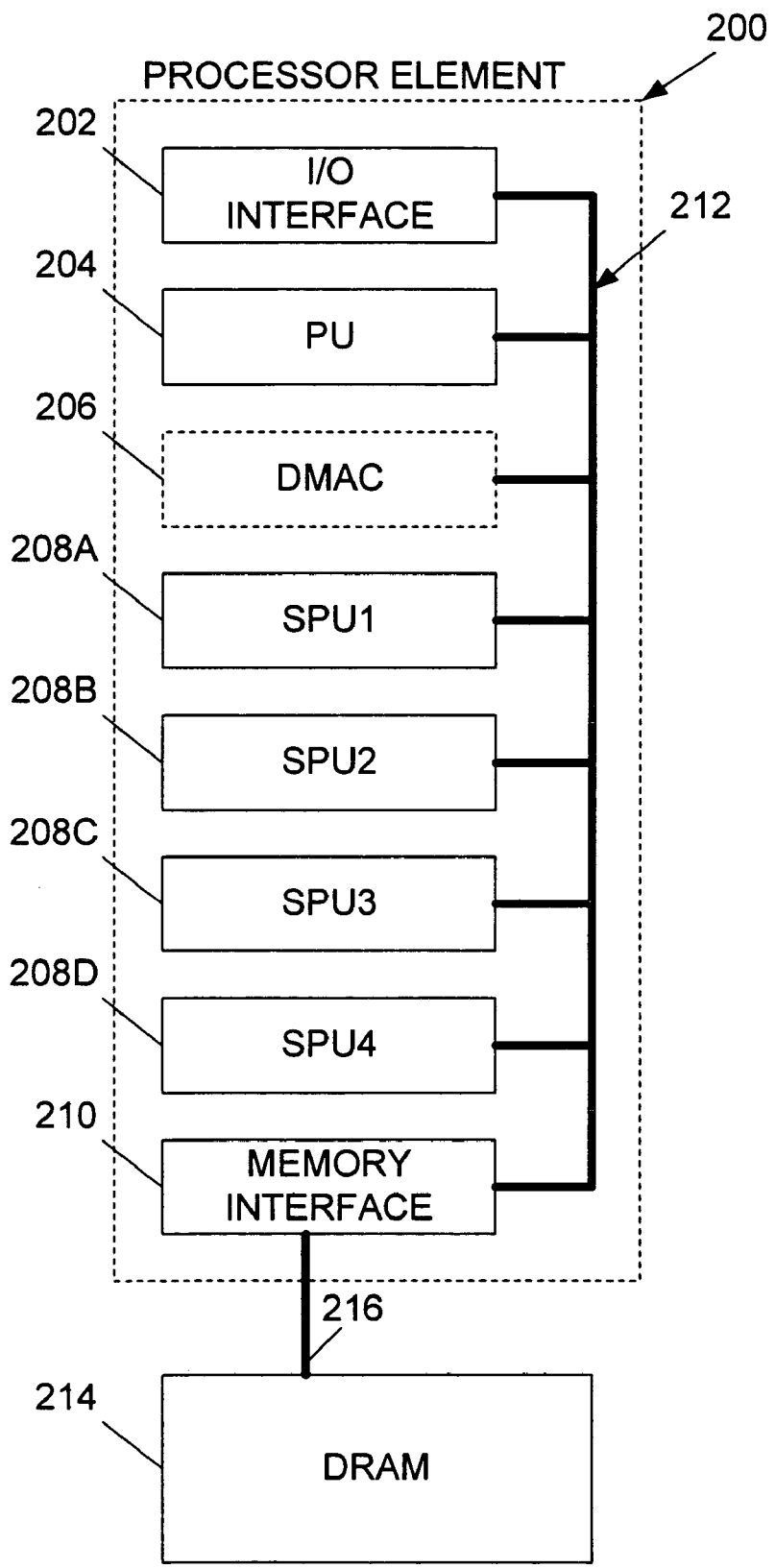
FIG. 2 is a diagram illustrating a preferred structure of a processor element (PE) in accordance with the present invention.

The sub-processing unit 208 further includes a bus interface (I/F) 258 for transmitting applications and data to and from the sub-processing unit 208. In a preferred embodiment, the bus I/F 258 is coupled to a DMAC 206, which is shown in dashed line to indicate that it may be integrally disposed within the sub-processing unit 208 as shown or may be externally disposed (as shown in FIG. 2). A pair of busses 268A, 268B interconnect the DMAC 206 between the bus I/F 258 and the local memory 250. The busses 268A, 268B are preferably 256 bits wide.

The sub-processing unit 208 further includes internal busses 260, 262 and 264. In a preferred embodiment, the bus 260 has a width of 256 bits and provides communications between the local memory 250 and the registers 252. The busses 262 and 264 provide communications between, respectively, the registers 252 and the floating point units 254, and the registers 252 and the integer units 256. In a preferred embodiment, the width of the busses 264 and 262 from the registers 252 to the floating point or the integer units is 384 bits, and the width of the busses 264 and 262 from the floating point or the integer units 254, 256 to the registers 252 is 128 bits. The larger width of these busses from the registers 252 to the floating point or the integer units 254, 256 than from these units to the registers 252 accommodates the larger data flow from the registers 252 during processing. A maximum of three words are needed for each calculation. The result of each calculation, however, normally is only one word.

Figure 4:
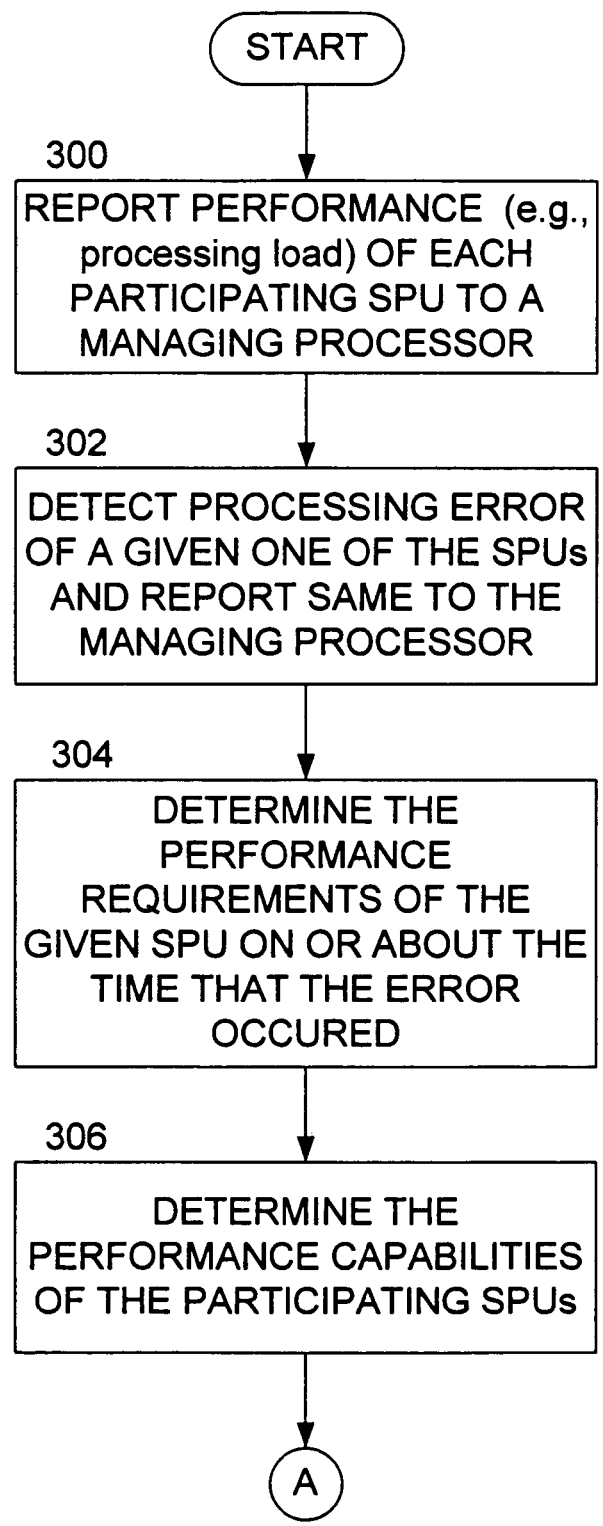
FIG. 4 is a flow diagram illustrating process steps that may be carried out by the multi-processing system in accordance with one or more aspects of the present invention.

Reference is now made to FIG. 4, which is a flow diagram illustrating process steps that may be carried out by the multi-processing system 100 of FIG. 1 or the multi-processing system 200 of FIG. 2 in accordance with one or more aspects of the present invention. At action 300 the main processing unit 204 receives information concerning the processing loads of the processor tasks carried by the respective participating sub-processing units 208. For example, each of the sub-processing units 208 may be operable to report its processing loads and/or processor tasks to the main processing unit 204 from time to time, or the main processing unit 204 may issue a request for such information. In any case the main processing unit 204 preferable receives information necessary to determine the processing loads of the processor tasks for each participating sub-processing unit 208.

For example, with reference to FIG. 2 the sub-processing unit 208A may be scheduled to perform processor task A and processor task B, where processor task A has an associated processor load of 0.1 and processor task B has an associated processor load of 0.3. Thus, the sub-processing unit 208A may be idle for 0.6. The sub-processing unit 208B may be scheduled to perform processor task C, processor task D, processor task E, and processor task F, with respective associated loads of 0.05, 0.01, 0.1, and 0.3. Thus, the sub-processing unit 208B may be idle for 0.54. The sub-processing unit 208C may be scheduled to perform processor task G and processor task H, with respective associated processor loads of 0.7 and 0.3. Thus, the sub-processing unit 208C is not idle. Finally, the sub-processing unit 208D is scheduled to perform processor task I, processor task J and processor task K, with respectively associated processor loads of 0.15, 0.05, 0.7. Thus, the sub-processing unit 208D may be idle for 0.1.

These processor tasks and/or the processor loads therefor are preferably tabulated in software for later use by the main processing unit 204.

At action 302, one of the sub-processing units 208A-D (such as SPU 208A) may exhibit an error, such as a hard, recoverable error. The error is preferably detected by or otherwise reported to the main processing unit 204. For example, the detection of the error may be achieved through a report by the sub-processing unit 208A to the main processing unit 204 using software. Alternatively, the error may be detected using any of the known hardware interrupt techniques.

At action 304, the main processing unit 204 preferably determines what the performance requirements are for the affected sub-processing unit, namely the sub-processing unit 208A. This is preferably achieved by accessing the tabular information concerning the processor tasks and/or processor loads obtained in step 300. (Alternatively, if action 300 is not employed, the information concerning processor tasks and/or processor loads may be obtained after the error occurs). In the illustrative example discussed thus far, the processor load on the sub-processing unit 208A is task A+task B=0.4.

At action 306 the main processing unit 204 preferably determines what the performance capabilities of the participating sub-processing units 208B-D. Again, this is preferably achieved by accessing the tabular information concerning the processor tasks and/or processor loads obtained in step 300. In keeping with the example discussed thus far, the processor capabilities of the sub-processing unit 208B is 0.54, the processor capabilities of the sub-processing unit 208C is 0.0, and the processor capabilities of the sub-processing unit 208D is 0.1.

Figure 5:
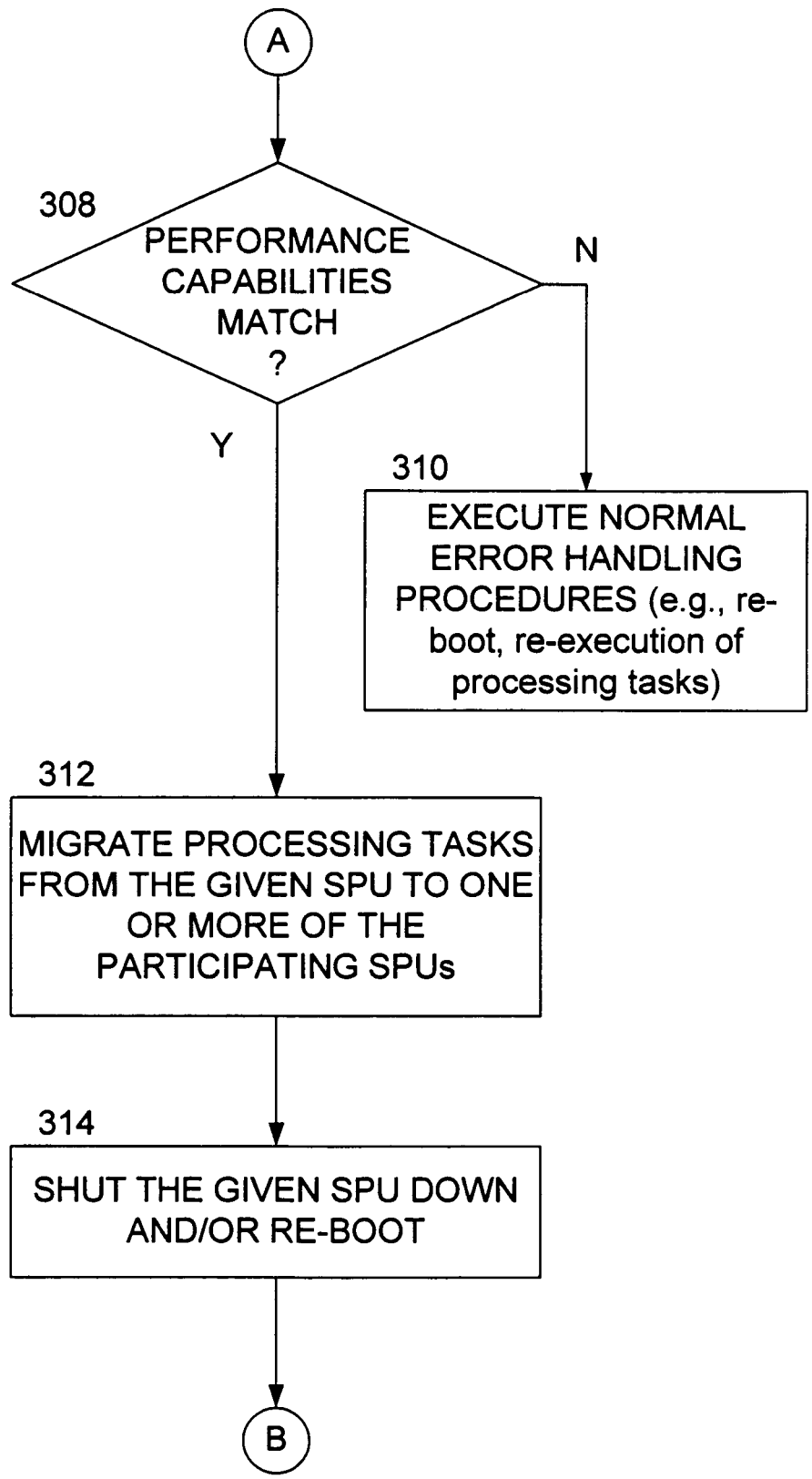
FIG. 5 is a flow diagram illustrating further process steps that may be carried out by the multi-processing system in accordance with the present invention.

With reference to FIG. 5, which is a flow diagram illustrating further process steps of the multi-processing system of the present invention, the process flow preferably advances to action 308. There, a determination is made as to whether one or more of the participating sub-processing units 208B-D have processing capabilities that match the needs of the sub-processing unit 208A. If the result of the determination is negative, the process flow preferably advances to action 310, where normal error handling procedures are carried out. For example, the sub-processing unit 208A may be subject to a re-boot process and the processing tasks may be re-executed.

If the result of the determination at action 308 is in the affirmative, however, the process flow preferably advances to action 312. There, the main processing unit 204 preferably re-allocates the processor tasks of the affected sub-processing unit, i.e., the sub-processing unit 208A, to one or more of the participating sub-processing units 208B-D that have the processing capabilities to handle the processor tasks from the sub-processing unit 208A. In the example discussed above, the processor tasks from the sub-processing unit 208A (totaling a processor load of 0.4) may be re-allocated to the sub-processing unit 208B (which has a processing capability of 0.54). It is noted, however, that the processor tasks may also be re-allocated to more than one of the participating sub-processing units 208B-D if desired (e.g., for load balancing, etc.)

At action 314, the affected sub-processing unit 208A is preferably shut down and/or is subject to a re-boot process. As it is preferred that an attempt is made to clear the error from the affected sub-processing unit 208A, it is most preferred that the sub-processing unit 208A is subject to a re-boot process at action 314. After the re-boot, the process flow preferably advances to action 316 (FIG. 6), where a determination is made as to whether the error is cleared. If the result of the determination at action 316 is negative, then the process preferably advances to action 318, where the affected sub-processing unit 208A remains in a shut-down condition. If the result of the determination at action 316 is in the affirmative, then the process flow preferably advances to action 320, where the status of the sub-processing unit 208A changes to indicate that it is a participating sub-processing unit that is capable of executing processor tasks. This change of status is preferably reported to the main processing unit 204, such that the main processing unit 204 may consider allocating (and/or re-allocating) processor tasks to the sub-processing unit 208A.

In accordance with further aspects of the present invention, it is preferred that at least one of the participating sub-processing units 208 is substantially unloaded and available to receive some or all of the processor tasks from another of the sub-processing units 208 that experiences a hard, recoverable error. In this regard, it is preferred that the main processing unit 204 migrates the processor tasks among the sub-processing units 208 such that one or more of the participating sub-processing units are not scheduled to perform any processor tasks and remains available to accept all of the processor tasks from an affected sub-processing unit 208, even if that sub-processing unit 208 is fully loaded at the time of the error.

Figure 6:
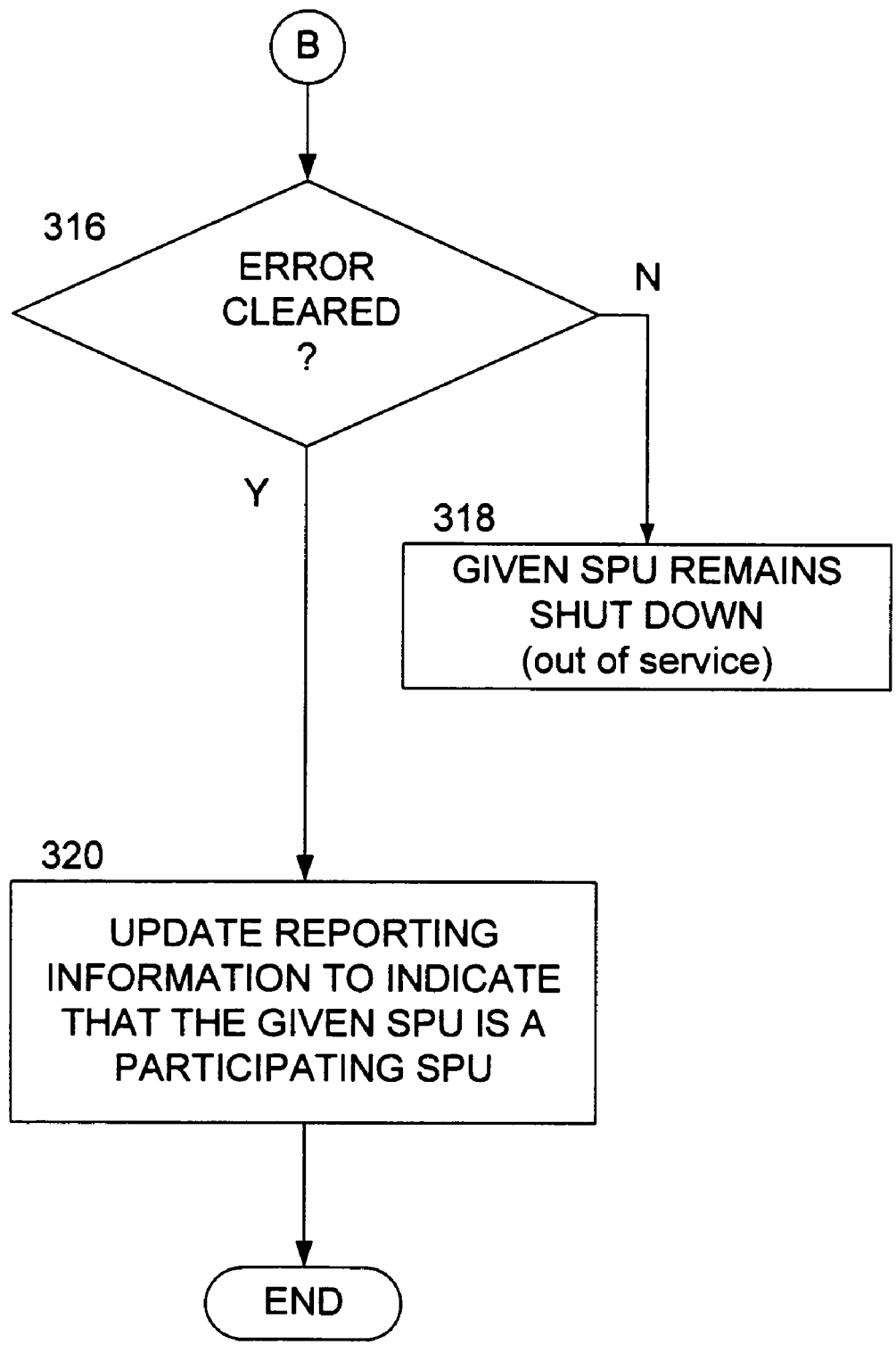
FIG. 6 is a flow diagram illustrating still further process steps that may be carried out by the multi-processing system in accordance with the present invention.
Figure 7:
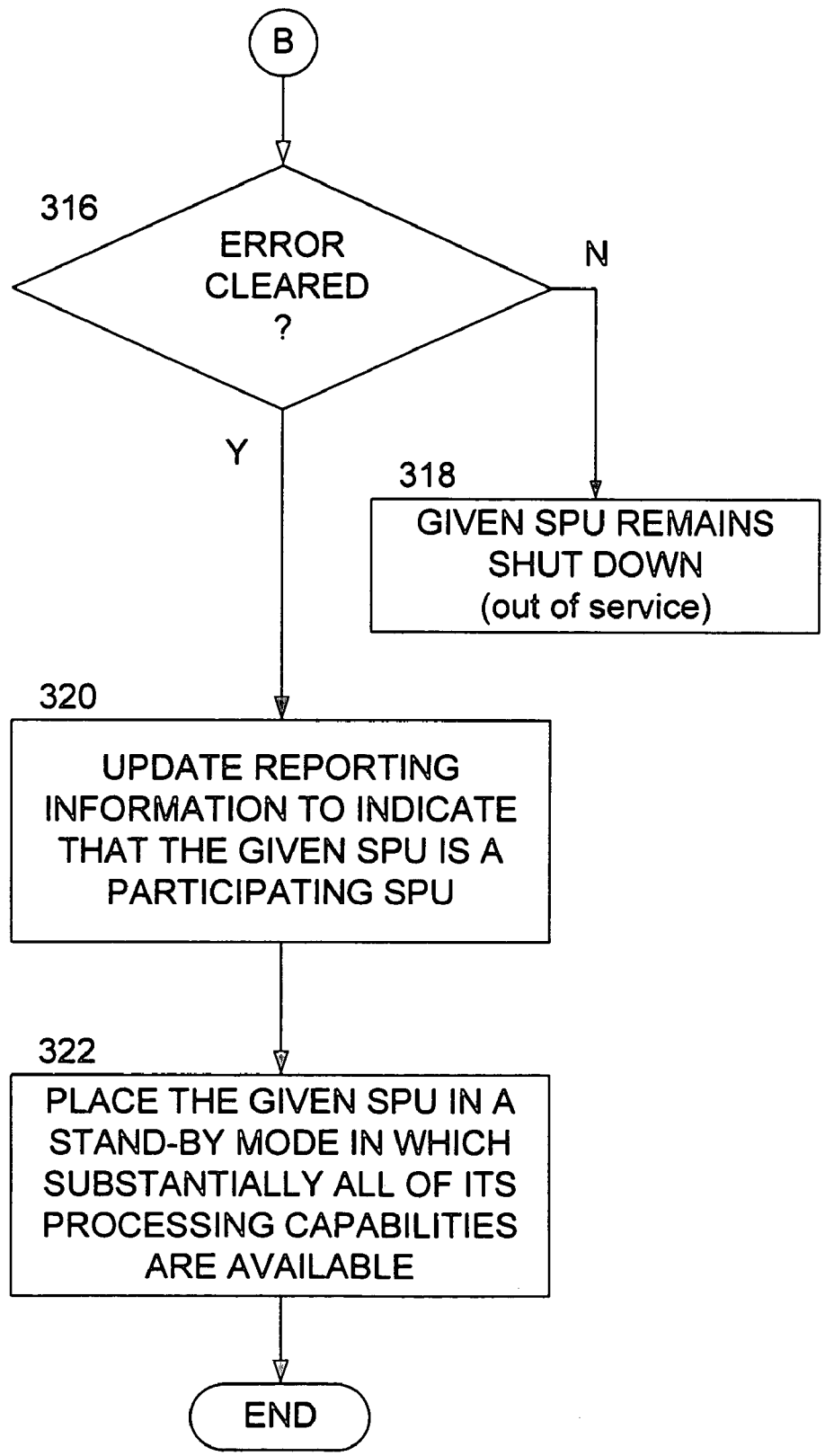
FIG. 7 is a flow diagram illustrating still further process steps that may be carried out by the multi-processing system in accordance with the present invention.

In connection with these aspects of the present invention, reference is now made to FIG. 7, which illustrates an alternative process flow diagram to that of FIG. 6. The process flow diagram of FIG. 7 is substantially the same of that of FIG. 6 except that after action 320 (where the affected sub-processing unit 208 changes status to a participating sub-processing unit), an additional action 322 is carried out. In particular, action 322 calls for placing the affected sub-processing unit (which is now available to execute processor tasks) in a stand-by mode in which it is not scheduled to perform any processor tasks and substantially all of its processing capabilities are available. This availability is preferably utilized when the re-allocation of processor tasks from another sub-processing unit 208 is desirable after such sub-processing unit 208 experiences an error. Advantageously, even if the affected sub-processing unit 208 is substantially fully loaded when the error occurs, all of those processor tasks may be re-allocated to the sub-processing unit 208 in the stand-by mode.

Figure 8:
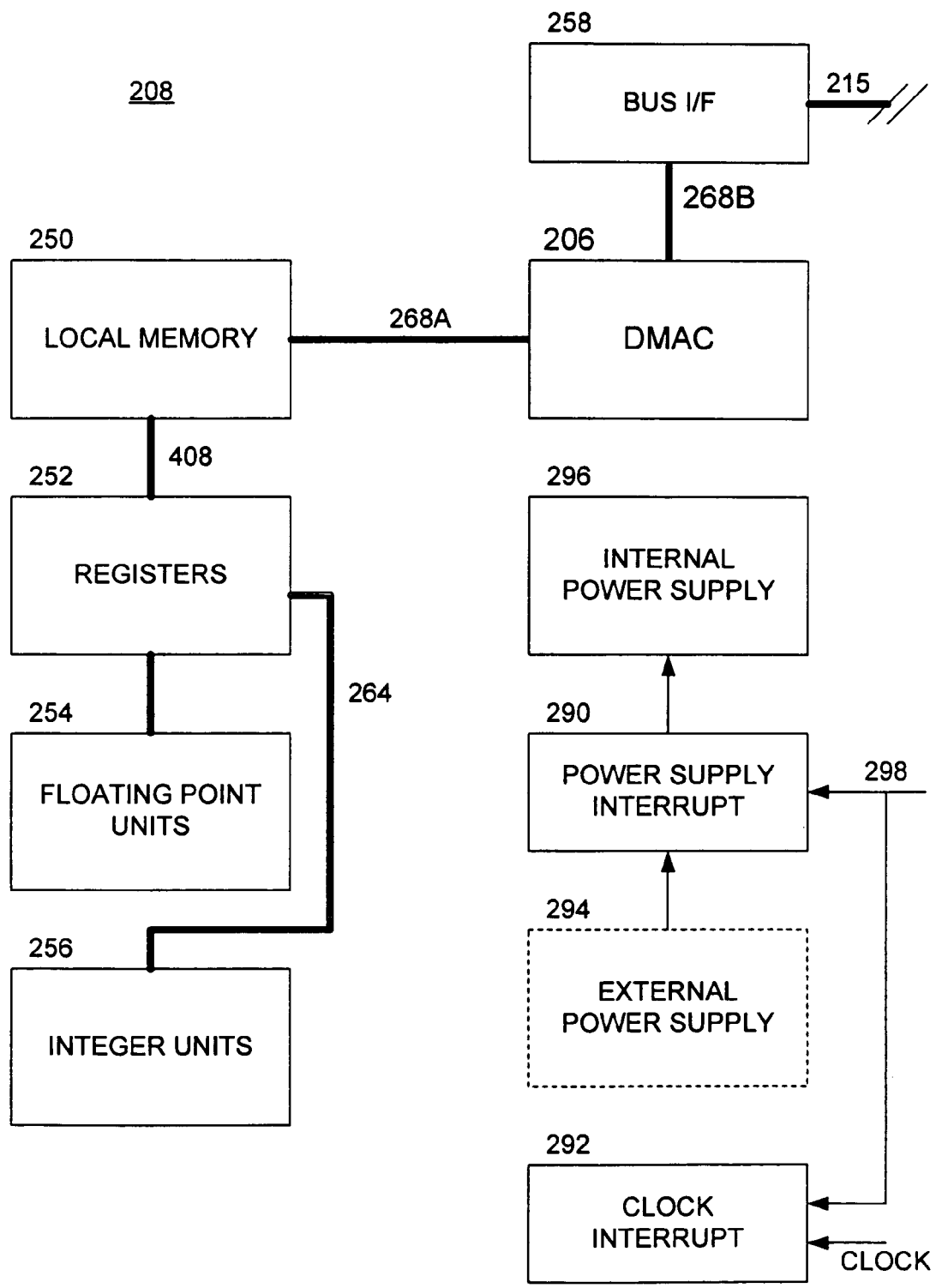
FIG. 8 is a diagram illustrating the structure of an alternative sub-processing unit (SPU) in accordance with the present invention.

In this regard, reference is now made to FIG. 8, which is a block diagram of the structure of a sub-processing unit 208 that is capable of being placed into a stand-by state. This structure is substantially similar to the sub-processing unit 208 of FIG. 3 in that it includes the local memory 250, the registers 252, the one ore more floating point units 254 and the one or more integer units 256. However, the sub-processing unit 208 also preferably includes at least one of a power supply interrupt circuit 290 and a clock interrupt circuit 292. When the power supply interrupt circuit 290 is employed, the power supply to the SPU 208 may be external 294 or internal 296. The power supply interrupt circuit 290 is preferably operable to place the sub-processing unit 208 into a stand-by state in response to a command signal on line 298.

In particular, when commanded, the power supply interrupt circuit 290 preferably shuts down or otherwise interrupts the delivery of power from the internal power supply 296 to the circuitry of the sub-processing unit 208, thereby shutting down the sub-processing unit 208 and drawing very little or no power. Alternatively, if an external power supply 294 is employed, then the power supply interrupt circuit 290 preferably interrupts the delivery of power from such power supply to the sub-processing unit 208 in response to a command on line 298.

Similarly, if the clock interrupt circuit 292 is employed, it is preferably operable to place the sub-processing unit 208 into the stand-by state by interrupting the system clock for the sub-processing unit 208, whether the system clock is generated internally or externally.

Figure 9:
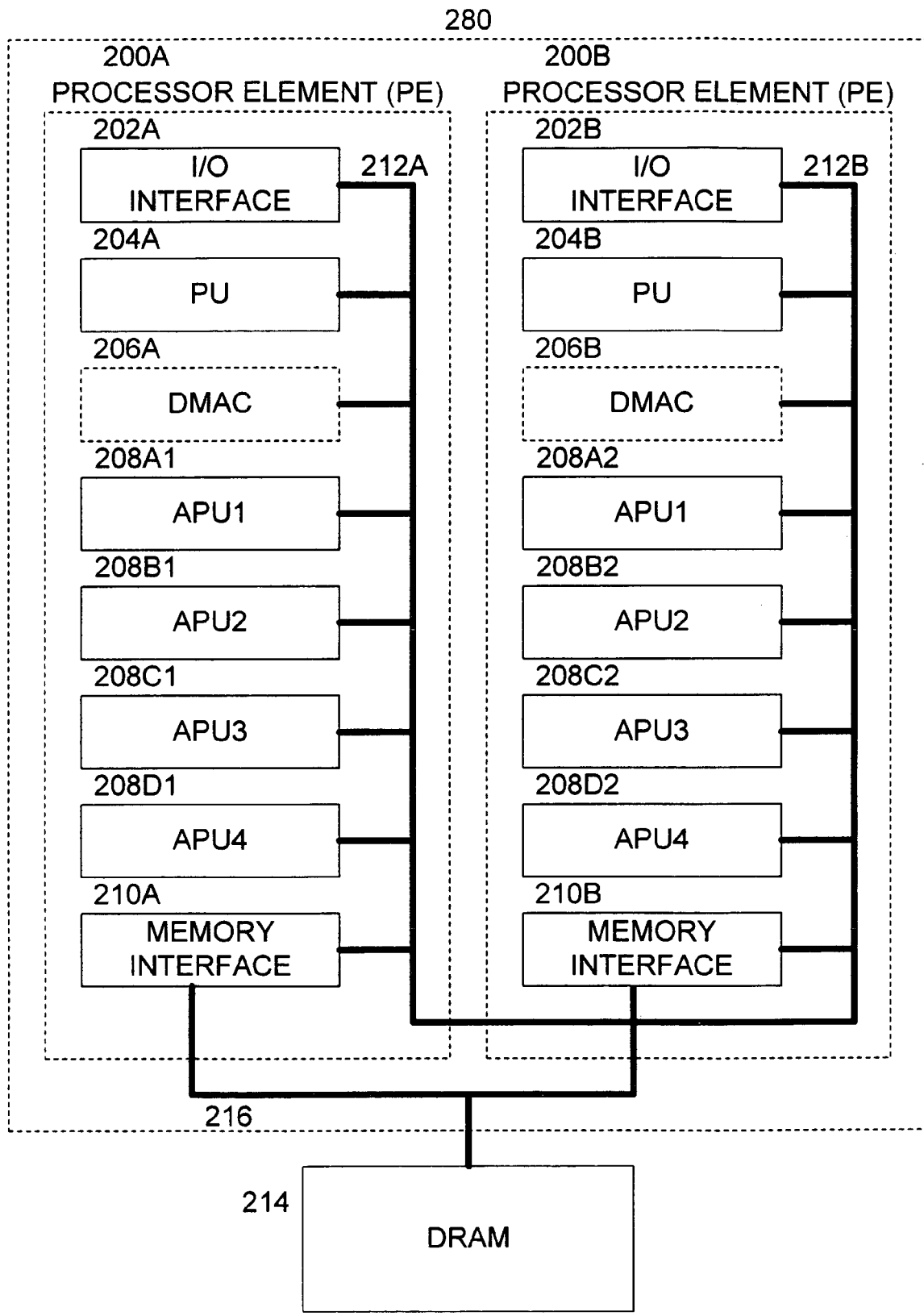
FIG. 9 is a diagram illustrating the structure of a processing system including more than one sub-processing unit in accordance with one or more further aspects of the present invention.

With reference to FIGS. 2 and 9, a number of processor elements 200 may be joined or packaged together to provide enhanced processing power. For example, as shown in FIG. 9, two or more processor elements 200A, 200B may be packaged or joined together, e.g., within one or more chip packages, to form a set of multi-processor units. This configuration may be referred to as a broadband engine (BE). As shown in FIG. 9, the broadband engine 280 contains the two processor elements 200A, 200B, which are interconnected for data communication over a bus 212. An additional data bus 216 is preferably provided to permit communication between the processor elements 200A, 200B and the shared DRAM 214. One or more input/output (I/O) interfaces 202A and 202B and an external bus (not shown) provide communications between the broadband engine 280 and any external elements. Each of the processor elements 200A and 200B of the broadband engine 280 perform processing of data and applications in a parallel and independent manner analogous to the parallel and independent processing of applications and data performed by the sub-processing elements 208 discussed hereinabove with respect to FIG. 2.

In accordance with one or more further aspects of the present invention, the participating sub-processing units may include one or more further sub-processing units of one or more further multi-processing systems, such as system 100 (FIG. 1), system 200 (FIG. 2), and/or system 280 (FIG. 9). As will be apparent to one skilled in the art from the description hereinabove, the participating sub-processing units, therefore, may include one or more respective groups of sub-processing units, where each group is associated with a respective main processing unit. As to the system 100 of FIG. 1, the main processing unit is processor 102A and the respective group of sub-processing units include processors 102B-D, which are associated with the main processing unit 102A. Similarly, if the system 200 of FIG. 2 is employed, then the participating sub-processing units may include further sub-processing units 208A-D that are associated with a further main processing unit 204. Still further, if the system 280 (broadband engine) of FIG. 9 is employed, then the participating sub-processing units may include an additional two (or more) groups of sub-processing units 208A1-D1, which are associated with the main processing unit 204A, and sub-processing units 208A2-D2, which are associated with the main processing unit 204B.

In this regard, the participating groups of sub-processing units (and the respective associated main processing units) may be part of a set of multi-processing units, such as is illustrated in FIG. 9 in which the respective groups of sub-processing units share a common data bus 212. Alternatively, or in addition, one or more of the respective groups of participating sub-processing units may be a stand alone multi-processing unit, such as is illustrated in FIG. 1 or 2, where no such common data bus exists between respective groups of sub-processing units. Further, one or more of the respective groups of participating sub-processing units may be at least part of a distributed multi-processing unit, where at least some of the sub-processing units are remotely located with respect to one another.

Figure 10:
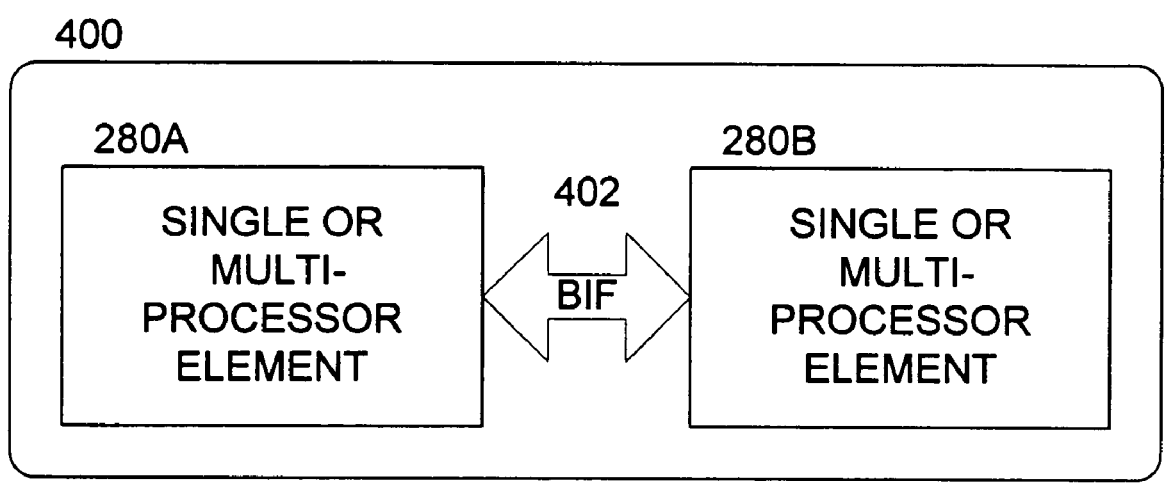
FIG. 10 is a diagram illustrating the structure of a processing system in which two multi-processing units are disposed on a common circuit board in accordance with one or more aspects of the present invention.

With reference to FIG. 10, the respective multi-processing units, whether part of a set or part of a stand alone configuration, may be disposed on common or different circuit boards, in common or different products, and/or at common or different locations. As shown in FIG. 10, a pair of broadband engines 280A and 280B (which happen to include respective sets of multi-processor elements 200) are disposed on a common circuit board 400. Although broadband engines 280A and 280B are illustrated in this example, it is noted that stand alone multi-processing units (such as employing a single processor element 200) are also contemplated. In any event, the respective multi-processing units 280A and 280B are interconnected by way of a broadband interface (BIF) 402.

Figure 11:
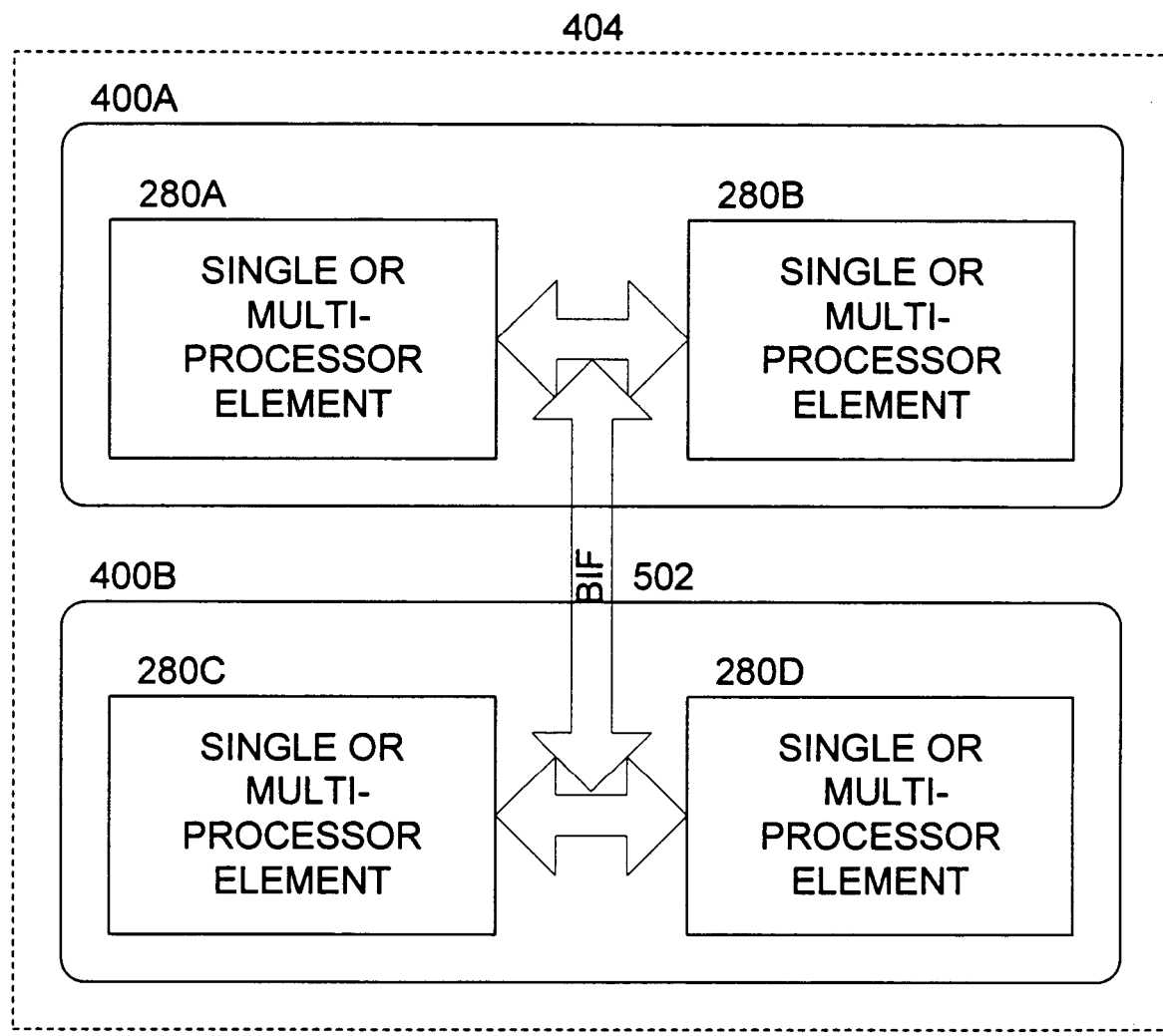
FIG. 11 is a diagram illustrating the structure of a processing system in which one or more multi-processing units are disposed on different circuit boards in accordance with one or more further aspects of the present invention.

With reference to FIG. 11, a plurality of multi-processing units 280A-D may be disposed on different circuit boards 400, while the circuit boards 400 are disposed in a single product 404. More particularly, the multi-processing units 280A and 280B are disposed on a common circuit board 400A, while the multi-processing units 280C and 280D are disposed on a different circuit board 400B. Both the circuit boards 400A and 400B, however, are disposed within a single product 404. Thus, data communications between the respective multi-processing units 280A-D may be carried out by way of a broadband interface (BIF) 502 that may include an intra-circuit board portion and an inter-circuit board portion.

As discussed above, the participating sub-processing units (e.g., 102B-D and/or 208A-D) of the respective multi-processing units may be disposed in different products. Data communications among such products (and sub-processing units) must, therefore, employ more than a bus interface and/or broadband interface within a single product. In this regard, reference is now made to FIG. 12. Here, the stand-alone multi-processing elements 208 or BEs 280 (sets of multi-processing elements) may be distributed among a plurality of products to form a multi-processing system 500. The elements or members (implemented as computer and/or computing devices) of the system 500 are preferably in communication over a network 504. The network 504 may be a local area network (LAN), a global network, such as the Internet, or any other computer network.

The members that are connected to the network 504 include, e.g., client computers 506, server computers 508, personal digital assistants (PDAs) 510, digital television (DTV) 512, and other wired or wireless computers and computing devices. For example, the client 506A may be a laptop computer constructed from one or more of the PEs 200 or other suitable multi-processing systems. The client 506B may be a desk-top computer (or set top box) constructed from one or more of the PEs 200 or other suitable multi-processing systems. Further, the server 506A may be a administrative entity (employing a database capability), which is also preferably constructed from one or more of the PEs 200. And so on.

Thus, the processing capabilities of the multi-processing system 500 may rely on a plurality of processor elements 200 disposed locally (e.g., one product) or disposed remotely (e.g., in multiple products). In this regard, reference is made to FIG. 13, which is a block diagram of an overall computer network in accordance with one or more aspects of the present invention. Again, the PEs 200 and/or broadband engines 280 (made of multiple PEs) may be used to implement an overall distributed architecture for the computer system 500.

Since the servers 508 of the system 500 perform more processing of data and applications than the clients 506, the servers 508 contain more computing modules (e.g., PEs 200) then the clients 506. The PDAs 510, on the other hand, in this example perform the least amount of processing. Thus, the PDAs 510 contain the smallest number of PEs 200, such as a single PE 200. The DTVs 512 perform a level of processing that is substantially between that of the clients 506 and the servers 508. Thus, the DTVs 512 contain a number of processor elements between that of the clients 506 and the servers 508.

Before returning to a description of the re-allocation features of the invention, further details concerning the distributed multi-processing system 500 will now be provided. The homogenous configuration for the system 500 facilitates adaptability, processing speed, and processing efficiency. Because each member of the system 500 performs processing using one or more (or some fraction) of the same computing module, e.g., processor element 200, the particular computer or computing device performing the processing of data and/or application is unimportant because the processing of such data and applications may be shared among the network's members. By uniquely identifying the software cells comprising the data and applications processed by the system 500, the processing results can be transmitted to the computer or computing device requesting the processing regardless of where this processing occurred. Because the modules performing this processing have a common structure and employ a common instruction set architecture, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by the system 500, the data and applications processed by this system may be packaged into uniquely identified, uniformly formatted software cells 502. Each software cell 502 contains, or can contain, both applications and data. Each software cell also contains an ID to globally identify the cell throughout the network 504 and the system 500. This uniformity of structure for the software cells, and the software cells unique identification throughout the network, facilitates the processing of applications and data on any computer or computing device of the network 504. For example, a client 506 may formulate a software cell 502 but, because of the limited processing capabilities of the client 506, transmit the software cell 502 to a server 508 for processing. Software cells 502 can migrate, therefore, throughout the network 504 for processing on the basis of the availability of processing resources on then network 504.

The homogenous structure of processors and software cells 502 of the system 500 also avoids many of the problems of today's heterogeneous networks. For example, inefficient programming modules which seek to permit processing of applications on any ISA using any instruction set, e.g., virtual machines such as the Java virtual machine, are avoided. The system 500, therefore, can implement broadband processing far more effectively and efficiently than conventional networks.

Figure 12:
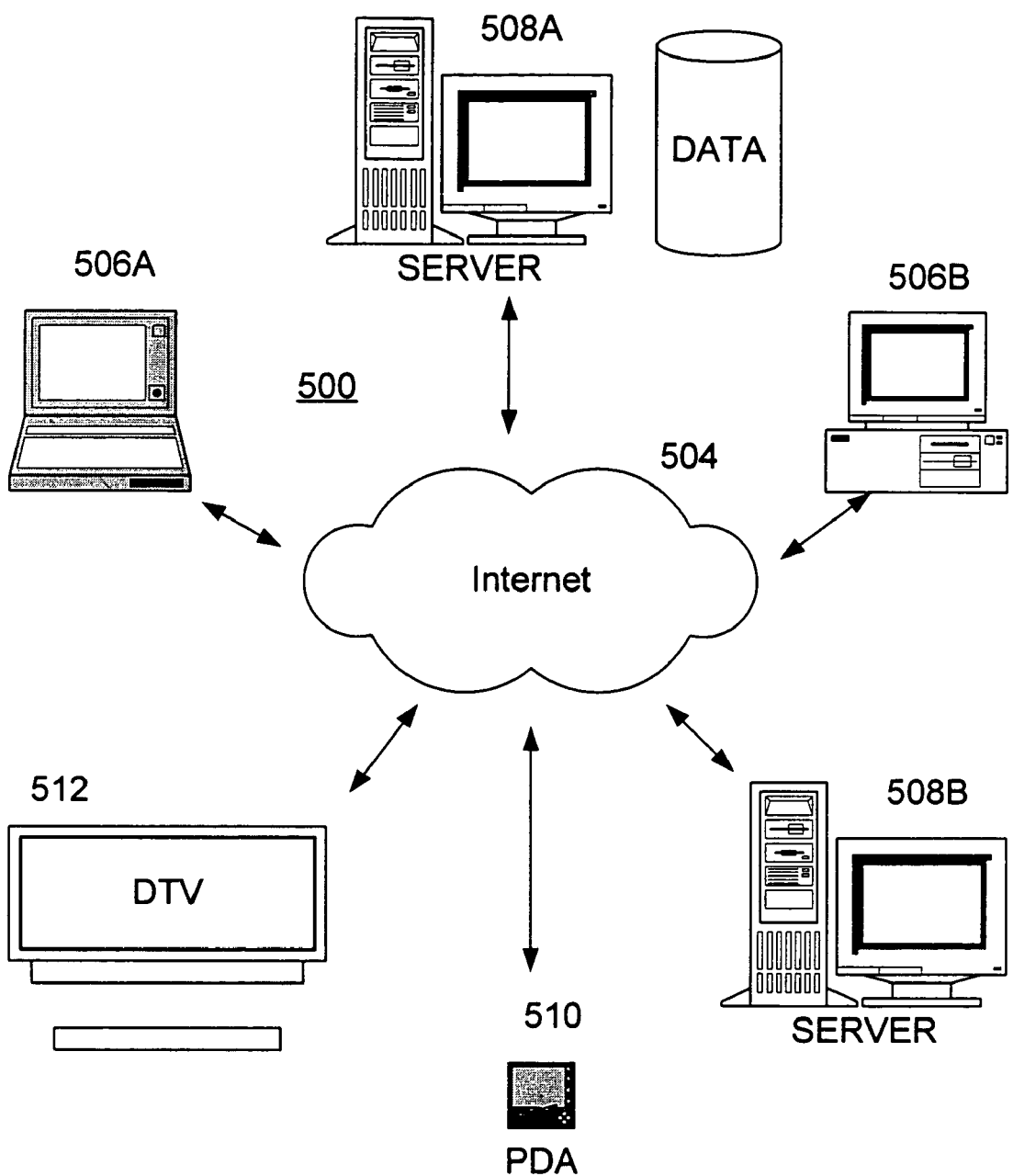
FIG. 12 is a diagram illustrating a plurality of multi-processing units are disposed in different products that may be interconnected by way of a network in accordance with one or more further aspects of the present invention.
Figure 13:
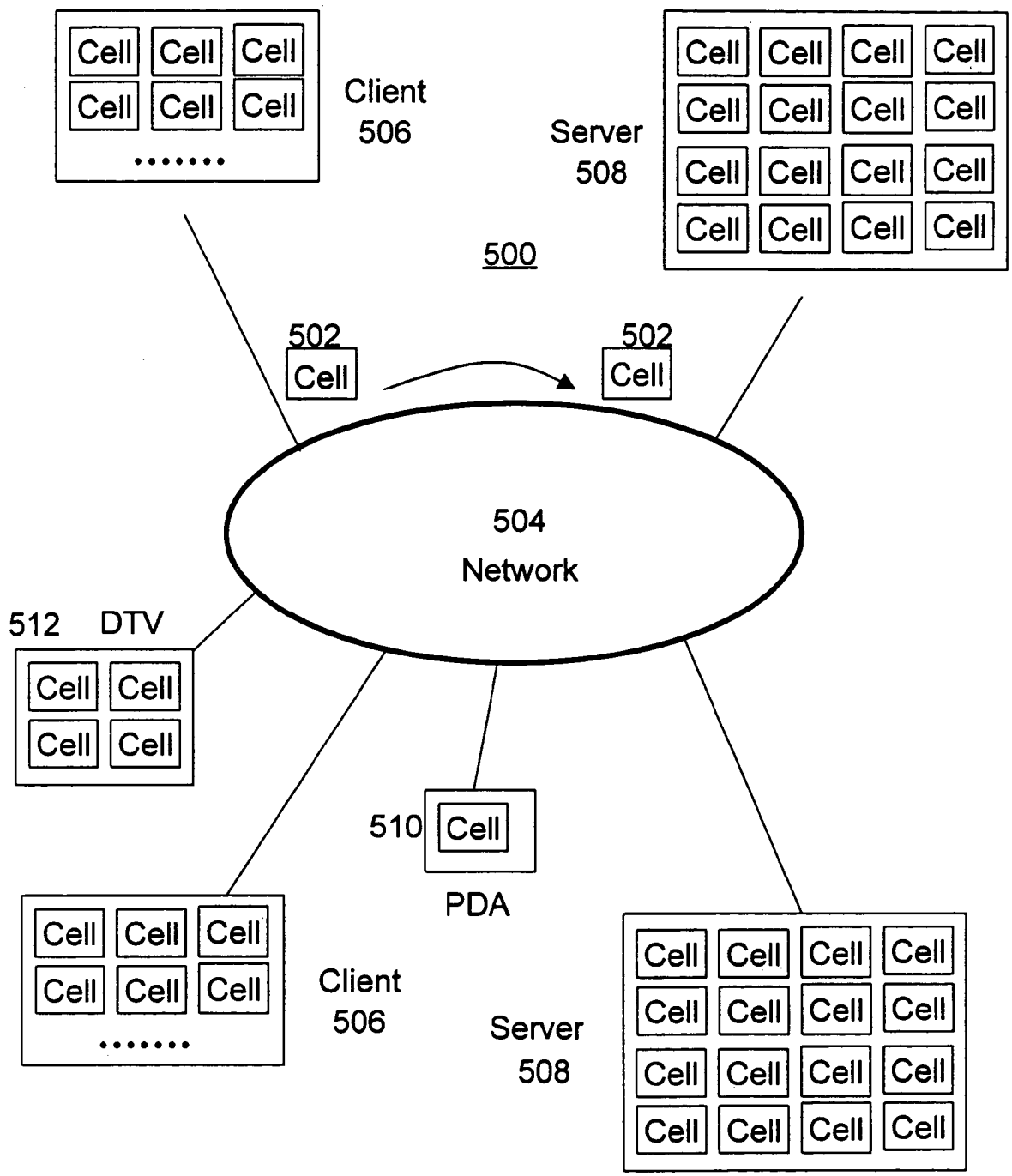
FIG. 13 is a block diagram of a software cell feature that may be used in conjunction with the multi-processing units the present invention.
Figure 14:
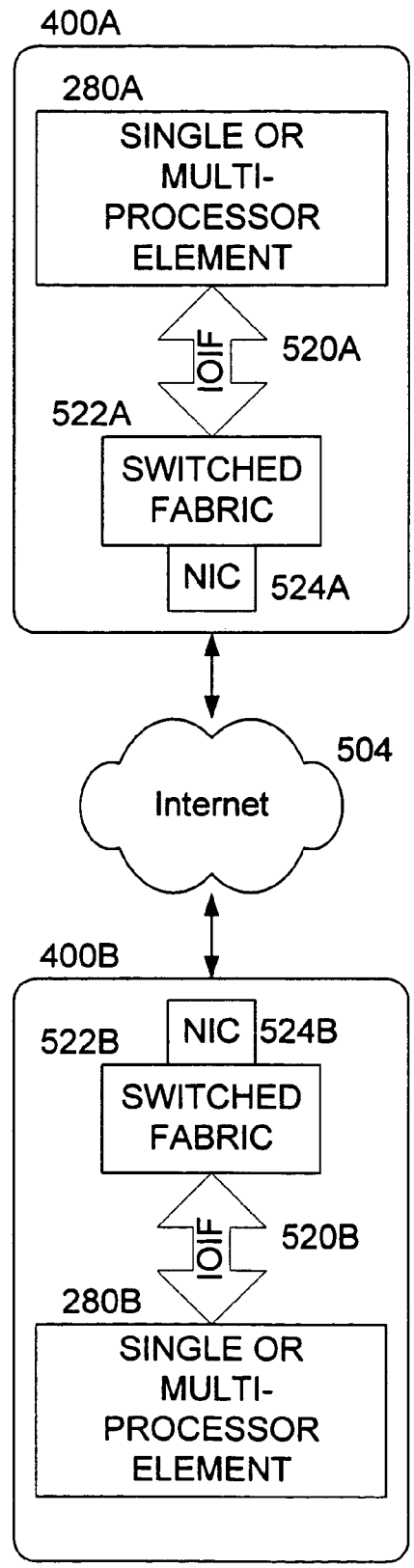
FIG. 14 is a diagram illustrating the structure of a processing system in which one or more multi-processing units are disposed on different circuit boards in different products in accordance with one or more further aspects of the present invention.

As discussed above, the respective multi-processing units (containing the participating sub-processing units) may be disposed on common or different circuit boards, in common or different products, and/or in common or different locations. When the respective multi-processing units are disposed in different products and/or at different locations (as illustrated in FIGS. 12 and 13), additional communication interface technology should be employed to interconnect such multi-processing units. In this regard, reference is now made to FIG. 14, which illustrates a pair of multi-processing units 280A and 280B, which are disposed on different circuit boards 400A and 400B, respectively. Each of the circuit boards 400A and 400B are disposed in different products, which are interconnected over a network 504, such as the Internet. In this regard, each of the circuit boards 400A and 400B preferably include an input/output interface (IOIF) 520, a switched fabric interconnect 522, and a network interface card (NIC) 524 to couple the respective multi-processing unit 280 to the network 504.

Providing for the ability to have the participating sub-processing units include respective groups of sub-processing units on different circuit boards and/or in different products and locations presents a problem because the greater the complexity and extent of the communications interface between respective groups of sub-processing units may adversely impact the processing throughput of the distributed system. This, in turn, may adversely affect the real-time, multi-media experience of a user of the system. Thus, care must be taken in selecting one or more of the sub-processing units to receive re-allocated processor tasks resulting from an error from among the participating sub-processing units. Indeed, without taking care in such selection, the communications costs, including communication bandwidth and communication latency, associated with a selected sub-processing unit may not be tolerable. For example, the complexity of the communications interface between the multi-processing unit 280A and the multi-processing unit 280B of FIG. 14, which includes the IOIF 520A, the switched fabric interconnect 522A, the NIC 524A, the Internet 504, the NIC 524B, the switched fabric interconnect 522B, and the IOIF 520B, may introduce limitations on the communication bandwidth and may increase the communication latency between the multi-processing units 280A and 280B to such an extent that the processing requirements in terms of throughput, speed, etc., may not be met if the processor tasks are re-allocated to such a remote multi-processing unit.

Figure 15:
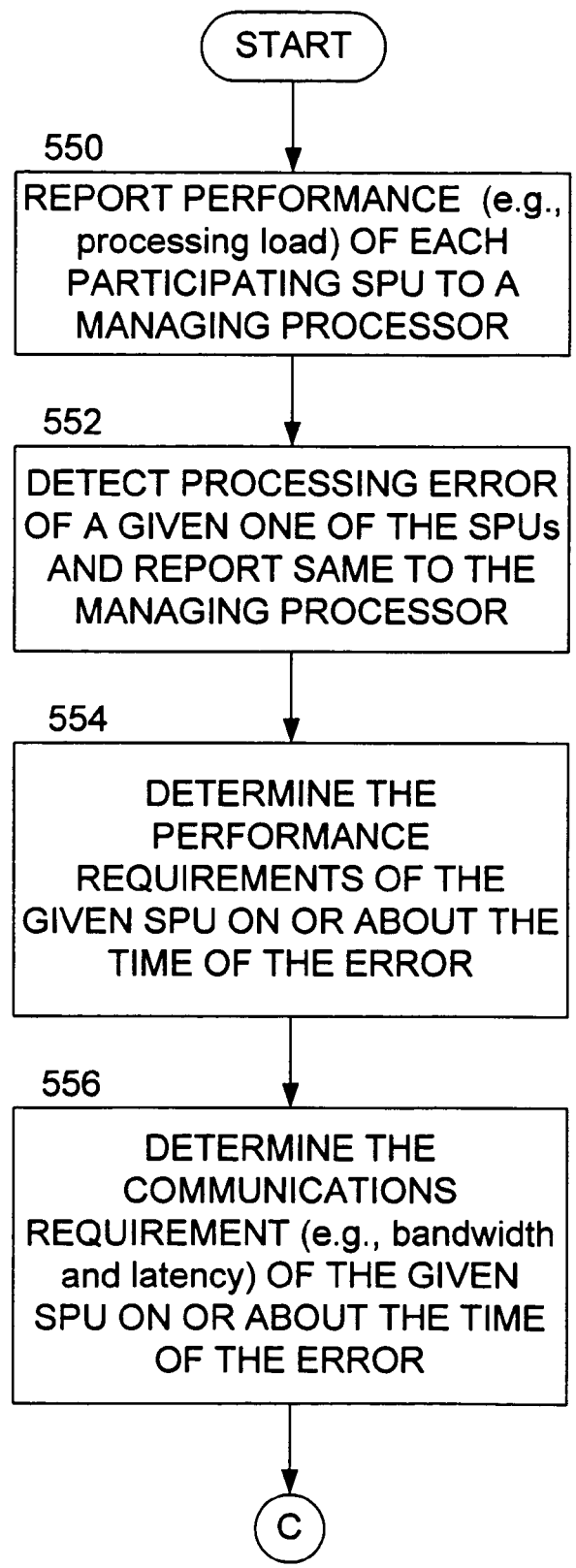
FIG. 15 is a flow diagram illustrating process steps that may be carried out by the multi-processing system in accordance with one or more aspects of the present invention.

In this regard, it is preferred that the methods and apparatus of the present invention take into account the communications requirements, including communication bandwidth and communication latency, needed between one or more sub-processing units intended to share processing results with and/or otherwise receive the results of the processor tasks of a given sub-processing unit, and the one or more participating sub-processing units to which the processor tasks may be re-allocated. Indeed, if the communications requirements are not properly considered, the re-allocation of the processor tasks to a remote sub-processing unit may result in undesirable and excessive delays in processing throughput and speed. In connection with the foregoing, reference is now made to FIG. 15, which is a flow diagram illustrating process steps that may be carried out by the multi-processing system in accordance with one or more further aspects of the present invention. Actions 550, 552, and 554 are substantially similar to actions 300, 302, and 304 discussed hereinabove with respect to FIG. 4. In the interests of brevity and clarity, therefore, the details of these actions will not be repeated here.

After the performance requirements of the affected sub-processing unit 208 is determined (action 554), the process flow advances to action 556. There, a determination is made as to the communications requirements (e.g., the bandwidth and latency requirements) associated with the affected sub-processing unit 208 on or about the time of the error. More particularly, the results of the processing tasks scheduled to be carried out by the affected sub-processing unit 208 prior to the error may be expected by one or more other sub-processing units 208 by some deadline in order to meet the desired real-time and/or multi-media experience goals of the multi-processing system. Alternatively, or in addition, the one or more other sub-processing units may be expected to share or otherwise transmit processing results (or other such data) with the affected sub-processing unit in order to meet those goals. Thus, at action 556, these communications requirements are determined such that better consideration may be given to determine which sub-processing unit 208 should receive the re-allocated processor tasks.

At action 558 (FIG. 16), the performance capabilities and communications capabilities of the participating sub-processing units 208 are determined. More particularly, the current processor loads on each of the participating sub-processing units 208 are determined to establish candidates for receiving the re-allocated processor tasks from the sub-processing unit 208 that experiences an error. Further, the communications capabilities, such as the communications bandwidth and the communications latency, associated with the participating sub-processing units 208 are also preferably determined such that sub-processing units 208 exhibiting inadequate communications capabilities may be excluded from the candidates.

The communications latency and/or communications bandwidth, whether they are requirements or costs, will most often be an issue in connection with the communications interfaces that may exist between sub-processing units in an overall system, such as system 500 (FIG. 12). These communications interfaces may include input/output busses and/or bus interfaces, which may be intra- or inter-sub-processing unit devices. The communications interfaces may also include switched fabric interconnects, network interfaces, and/or other network transmission devices. Indeed, the communications interfaces as contemplated by the present invention include any device in the communications path between sub-processing units that can increase or decrease latency and/or increase or decrease bandwidth.

Those skilled in the art will appreciate from the description herein that the ability to keep track of the performance capabilities and the communications capabilities of the participating sub-processing units 208 becomes more difficult as the extent of the distributed multi-processing system 500 (FIG. 12) expands. Therefore, the multi-processing units containing participating sub-processing units 208 may be in communication with an administrative entity, such as the server 508A shown in FIG. 12. The administrative entity 508A preferably includes a database containing a table that is utilized in connection with maintaining information concerning the performance capabilities and communications capabilities of the participating sub-processing units 208.

In this regard, reference is now made to FIG. 17, which illustrates the kind of information that is preferably contained in the table 600. In particular, the table 600 preferably includes performance information indicative of the processor loads for the participating sub-processing units. This information is contained in column 602. The table 600 also preferably includes communications information indicative of the communication bandwidth and the communication latency that would exist between one of the participating sub-processing units to which the processor tasks may be re-allocated and one or more the sub-processing unit(s) to share processing results (data) with the given sub-processing unit. This communication information is shown in column 604.

The table 600 also preferably includes location information indicative of where the participating sub-processing units are disposed among the multi-processing units of the system. This information preferably includes an identifier of a particular product (column 606), an identifier of a particular circuit board within the product (column 608), an identifier of a particular multi-processing unit, such as a broadband engine, on a given circuit board (column 610), and an identifier of a particular sub-processing unit within a given multi-processing unit (column 612). It is preferred that the administrative entity 508A receives the performance information, communication information, and/or location information from the respective multi-processing units containing the participating sub-processing units.

Figure 16:
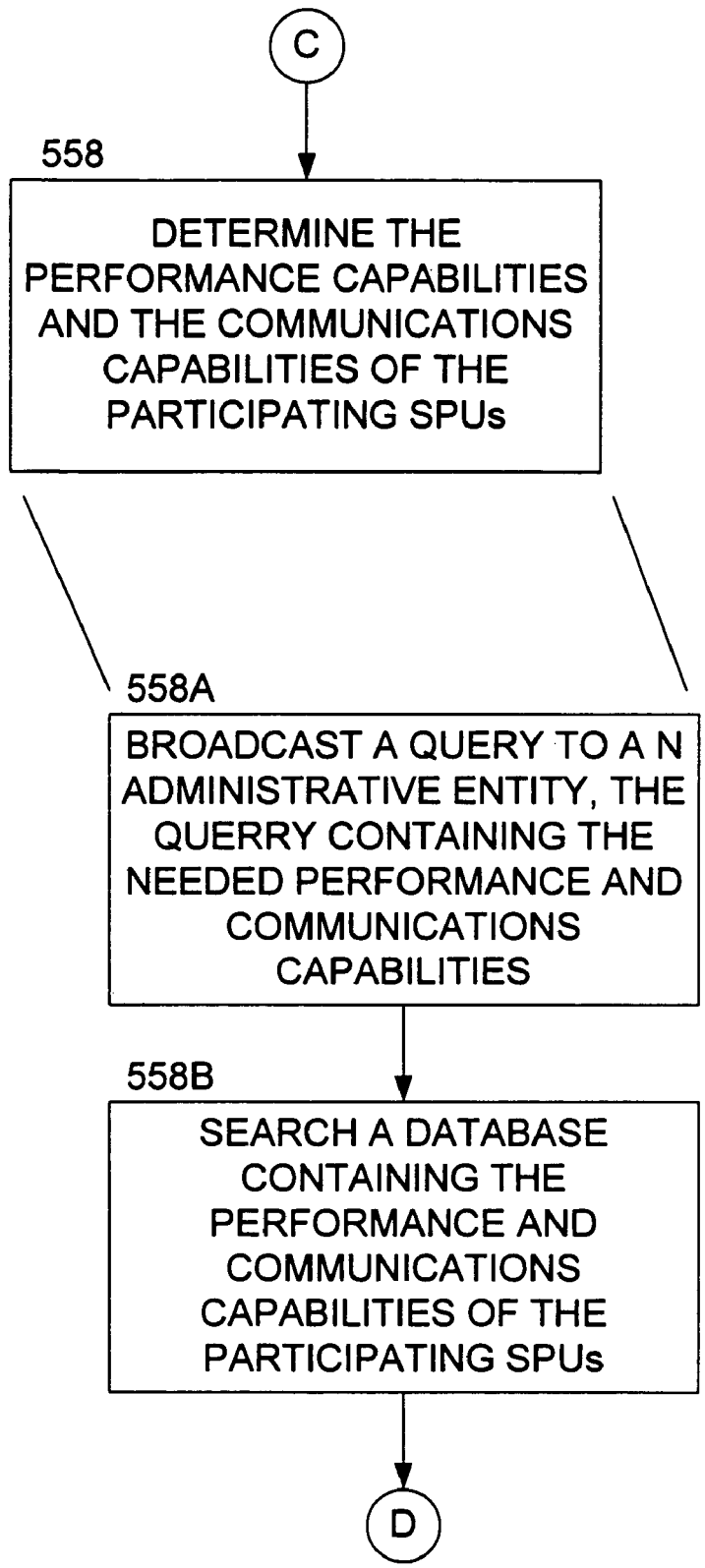
FIG. 16 is a flow diagram illustrating further process steps that may be carried out by the multi-processing system in accordance with the present invention.

With this arrangement, a main processing unit of a given multi-processing unit may broadcast a query to the administrative entity 508A, where the query contains an indication of the processing capabilities and communication capabilities needed to complete the processor tasks associated with a sub-processing unit in which an error has occurred (action 558A of FIG. 16). In turn, the administrative entity 508A may search the database (i.e., the table 600) to establish candidates for receiving the re-allocated processor tasks from the sub-processing unit experiencing the error (action 558B of FIG. 16).

Figure 18:
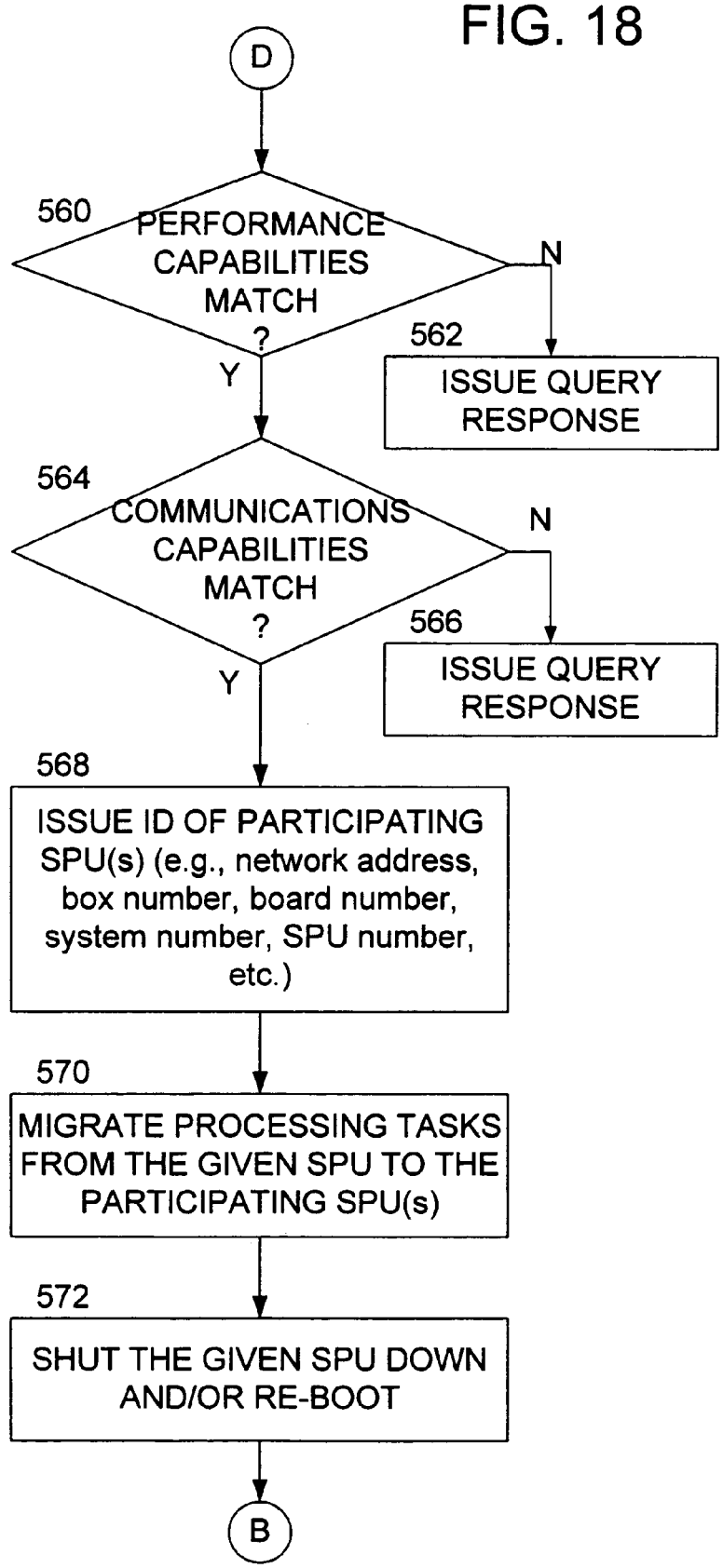
FIG. 18 is a flow diagram illustrating still further process steps that may be carried out by the multi-processing system in accordance with the present invention.

With reference to FIG. 18, at action 560, a determination is preferably made as to whether any of the performance capabilities of the participating sub-processing units match the performance requirements contained in the query. If the result of the determination is negative, then the process flow preferably advances to action 562, where a response to the query is issued indicating that a re-allocation cannot be carried out. If the result of the determination at action 560 is in the affirmative, then the process preferably advances to action 564. There, a further determination is made as to whether the communications capabilities of any of the participating sub-processing units match the communications requirements of the query. If the result of the determination at action 564 is negative, then the process flow preferably advances to action 566, where a response to the query is issued indicating that no re-allocation of the processor tasks may be carried out. If the result of the determination at action 564 is affirmative, then the process flow preferably advances to action 568. There, one or more of the participating sub-processing units is identified (e.g., by network address, product number, broadband number, multi-processing unit number, and/or sub-processing unit number). This information is preferably provided to the multi-processing unit that issued the query so that the processor tasks of the affected sub-processing unit may be re-allocated to the selected participating sub-processing unit (action 570).

At action 572, the sub-processing unit experiencing the error is preferably shut down and/or subject to a re-boot process as was discussed with respect to action 314 of FIG. 5. The further processing steps illustrated in FIG. 6 and/or FIG. 7 are also contemplated.

As the re-allocation of the processor tasks of the affected sub-processing unit is based on the performance capabilities and communications capabilities of the participating sub-processing units, adverse affects due to inadequate communications bandwidth and/or excessive communications latency may be avoided. This insures an increased likelihood that the real-time, multi-media experience of the user will not be adversely impacted by the error and resultant re-allocation of processor tasks.

Figure 20:
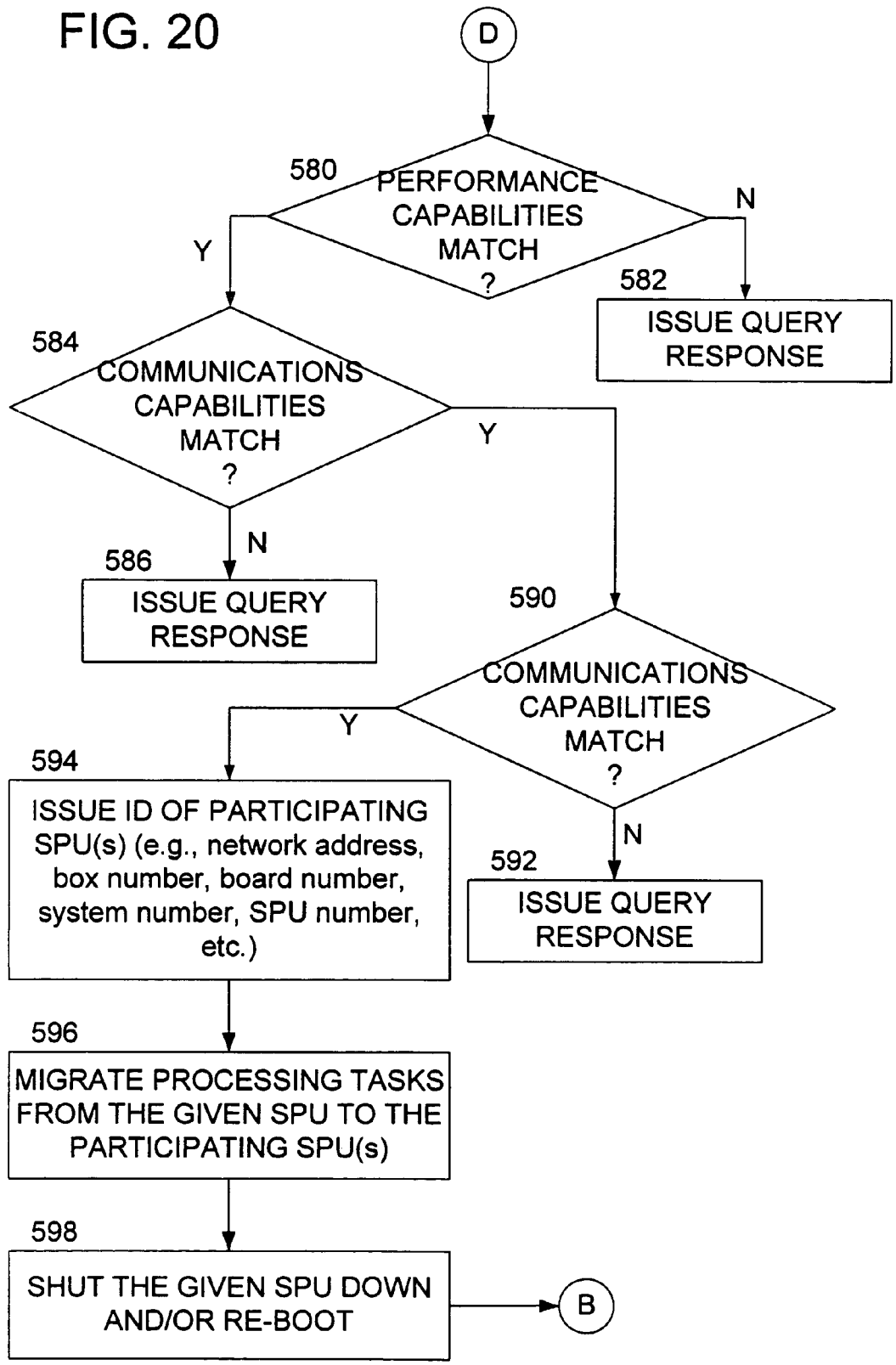
FIG. 20 is an alternative flow diagram to that of FIG. 18 that illustrates still further process steps that may be carried out by the multi-processing system in accordance with the present invention.

Reference is now made to FIGS. 19 and 20, which illustrate one or more further aspects of the present invention. In particular, the participating sub-processing units may be utilized in a lease arrangement in which one or more entities that are associated therewith (such as by way of ownership, contractual obligations, etc.) may collect fees for the use thereof when the processor tasks of the given sub-processing unit are re-allocated. In this regard, the table 600A of the administrative entity 508A preferably includes the information contained in the table 600 of FIG. 17 as well as further information, including availability information and cost information. The availability information is preferably indicative of at least the processing power of the participating sub-processing units that may be leased for use. For example, the processing power may be quantified in terms of millions of instructions per second (MIPS) or some other quantity known in the art. The cost information is preferably indicative of respective fees for using the participating sub-processing units for lease. The cost information preferably facilitates the quantification of the fee, such as dollars per MIP or any other suitable quantification. It is preferred that the administrative entity 508 receives the availability information 614 and/or the cost information 616 (as well as the other information tabulated therein) from the respective multi-processing units containing the participating sub-processing units.

With this arrangement, a main processing unit of a given multi-processing unit may broadcast a query to the administrative entity 508A, where the query contains an indication of the processing capabilities and communication capabilities needed to complete the processor tasks associated with a sub-processing unit in which an error has occurred (action 558A of FIG. 16). The query may also include the processor loads of the tasks of the given sub-processing unit, the location of the given sub-processing unit, etc. It is noted that the given sub-processing unit may perform multiple processor tasks, each placing a different load on the processing unit. Thus, the "processor load" may be considered processor task specific or related to a group of processor tasks depending on the circumstances. Still further, the query may include lease information indicating an acceptable cost of leasing processing power from one or more of the participating sub-processing units. For example, an entity associated with the given sub-processing unit in which an error has occurred may wish to place some limit or goal as to the cost that it is willing to pay for leasing the processing power from one or more of the participating sub-processing units. This information is preferably quantified in some way within the lease information.

The table 600A of the administrative entity 508A is preferably used to determine which of the participating sub-processing units should be re-allocated with the processor tasks of the given sub-processing unit. To this end, the administrative entity 508A may utilized the query issued by the main processing unit associated with the given sub-processing unit as search criteria for accessing the database (i.e., the table 600A) to establish candidates for receiving the re-allocated processor tasks from the sub-processing unit experiencing the error (action 558B, FIG. 16).

With reference to FIG. 20, at action 580, a determination is preferably made as to whether any of the performance capabilities of the participating sub-processing units match the performance requirements contained in the query. If the result of the determination is negative, then the process flow preferably advances to action 582, where a response to the query is issued indicating that a re-allocation cannot be carried out. If the result of the determination at action 580 is in the affirmative, then the process preferably advances to action 584. There, a further determination is made as to whether the communications capabilities of any of the participating sub-processing units match the communications requirements of the query. If the result of the determination at action 584 is negative, then the process flow preferably advances to action 586, where a response to the query is issued indicating that no re-allocation of the processor tasks may be carried out. If the result of the determination at action 584 is affirmative, then the process flow preferably advances to action 590.

At action 590, a determination is made as to whether any of the cost information 616 of the table 600A associated with the participating sub-processing units match the lease information contained in the query. In this regard, the determination may entail whether the cost information indicates that the fee is less than or equal to the amount willing to be paid for leasing the processor power of one or more of the participating sub-processing units. Preferably, the one or more sub-processing units for lease having the lowest fee or fees are selected to receive the re-allocation of the processor tasks of the given sub-processing unit. If the result of the determination at action 590 is negative then the process flow preferably advances to action 592, where a response to the query is issued indicating that no reallocation of the processor tasks may be carried out. If the result of the determination at action 590 is in the affirmative, then the process flow preferably advances to action 594.

At action 594, one or more of the participating sub-processing units is identified (e.g., by network address, product, broadband number, multi-processing unit number, and/or sub-processing unit number). This information is preferably provided to the multi-processing unit that issued the query so that the processor tasks of the affected sub-processing unit may be re-allocated to the selected participating sub-processing unit for lease.

At action 598, the sub-processing unit experiencing the error is preferably shut down and/or subject to a re-boot process as was discussed with respect to action 314 of FIG. 5. The further processing steps illustrated in FIG. 6 and/or FIG. 7 are also contemplated.

In accordance with one or more further aspects of the present invention, it may be desirable to facilitate the re-allocation of processor tasks from the given sub-processing unit to one or more participating sub-processing units without the use of an administrative entity 508A as was discussed hereinabove with respect to FIGS. 12-20. Indeed, as the demand for real-time communication between processing units over a network increases, the use of a central server or administrative entity 508A may become difficult to implement. Thus, it may be desirable to achieve processor-to-processor communication and re-allocation of processor tasks without utilization of an administrative entity.

To this end, the main processing unit associated with the given sub-processing unit experiencing processing errors is preferably operable to issue one or more requests for response to one or more of the participating sub-processing units. The purpose of the requests for response is to obtain responses from the participating sub-processing units so that the main processing unit may make a determination as to re-allocation options. The kind of information that is preferably obtained through the responses includes at least some of the information contained in the tables 600 and 600A of FIGS. 17 and 19. Indeed, a participating sub-processing unit may readily receive a request for response and prepare and transmit a response thereto that contains at least one of performance information, communication information, availability information, cost information, product identification information, circuit board identification information, broadband engine identification information, and sub-processing unit identification information.

Figure 21:
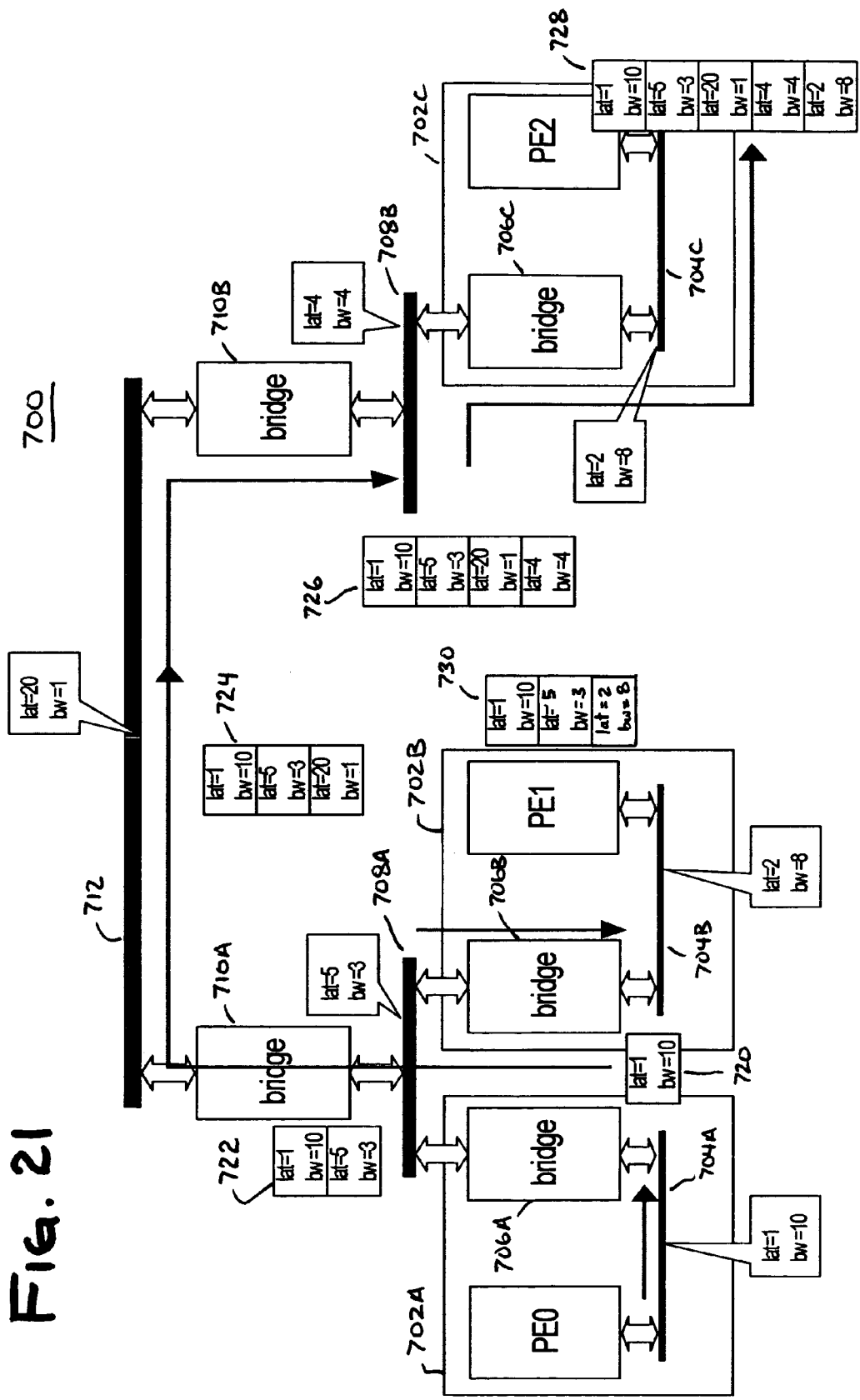
FIG. 21 is a combination block diagram and flow diagram of a multi-processor system in accordance with one or more further aspects of the present invention.
Figure 22:
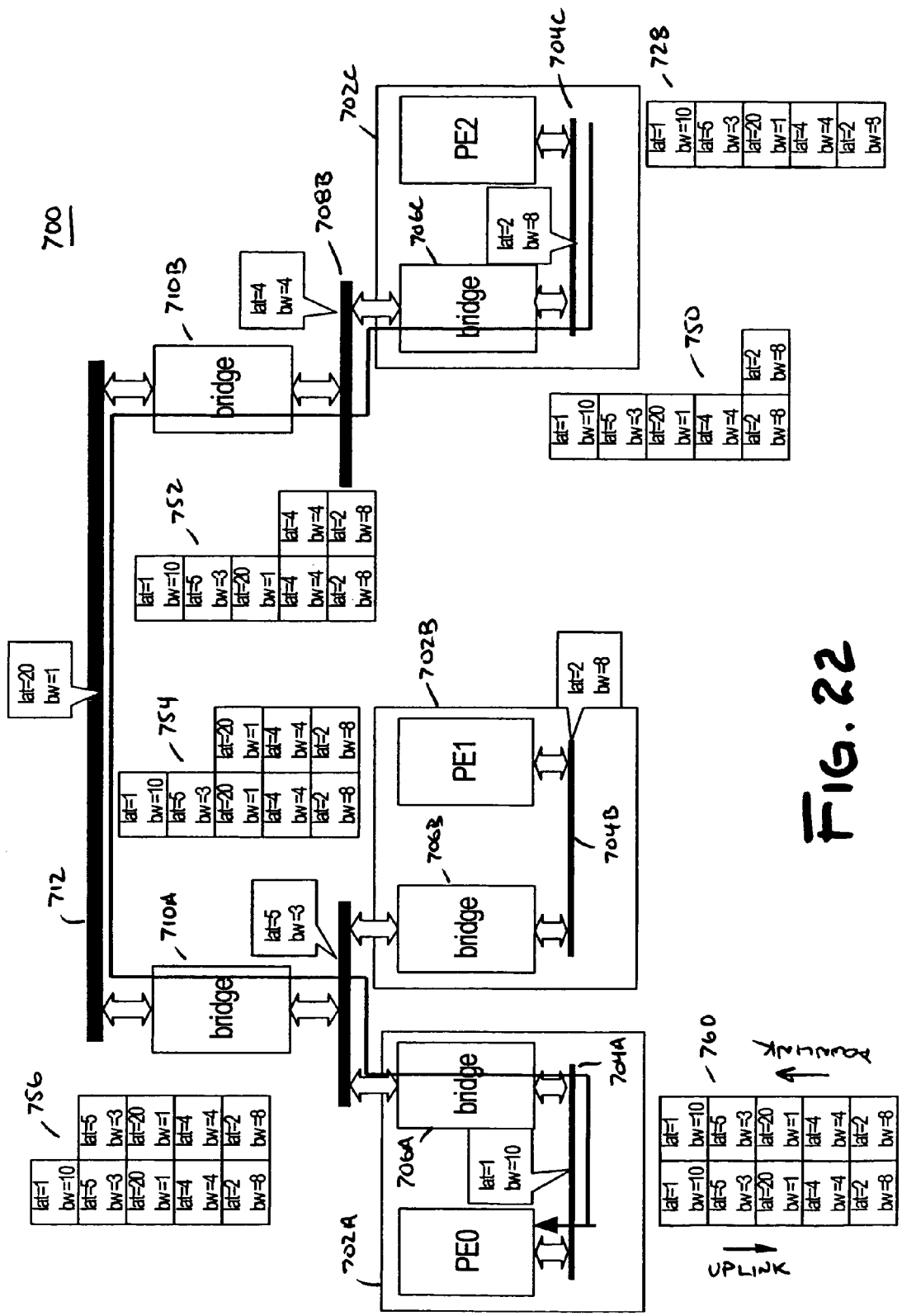
FIG. 22 is a combination block diagram and flow diagram of a multi-processor system in accordance with one or more further aspects of the present invention.

With reference to FIGS. 21 and 22, an example is illustrated as to how one or more requests for response may be issued and how one or more responses may be received by a particular main processing unit that is associated with one or more sub-processing units. As shown in FIG. 21, a multi-processor system 700 may include a plurality of circuit boards (and/or products or systems) 702 that may be disposed in the same or different vicinity. In any case, each of the circuit boards 702A-C may contain one or more processing elements PE0, PE1, PE2, etc. Each of the processor elements may be implemented utilizing the configuration of FIG. 1 and/or the configuration of FIG. 2 all depending on the exigencies of the particular application. The respective processor elements are interconnected by way of a network consisting of a plurality of data buses, communications bridges, and/or other communications interface hardware and software, the details of which are known in the art. It is noted, however, that each of the buses and/or communications bridges (which may be considered communications interfaces) have performance limitations including latency and bandwidth constraints. These communications constraints (or costs) should be considered when the re-allocation of processor tasks is being determined.

The circuit board 702A includes a data bus 704A and a bridge 706A. The circuit board 702B includes a data bus 704B and a bridge 706B. The circuit board 702C includes a data bus 704C and a bridge 706C. In accordance with one embodiment of the invention, the bridges 706A and 706B of circuit boards 702A and 702B may be interconnected by way of a data bus 708A. Similarly, the bridge 706C of circuit board 702C may be interconnected to one or more other bridges (not shown) by way of a bus 708B. The data buses 708A and 708B may be interconnected by way of bridge circuits 710A and 710B that are, in turn, interconnected by way of a data bus 712.

The data bus 704A may exhibit a latency of 1 and a bandwidth of 10. It is understood that this latency and bandwidth may be associated solely with the data bus 704A and/or may be associated with the combination of the data bus 704A and the bridge 706A. It is also understood that the latency and bandwidth values are given by way of example only and have been highly simplified for the purposes of brevity and clarity. The data bus 704B and the data bus 704C may both exhibit latencies of 2 and bandwidths of 8. The data bus 708A may exhibit a latency of 5 and a bandwidth of 3, while the data bus 708B may exhibit a latency of 4 and a bandwidth of 4. Still further, the data bus 712 may exhibit a latency of 20 and a bandwidth of 1.

Assuming that one or more of the sub-processing units within the processor element PE0 are exhibiting processing errors, then the main processing unit of processor element PE0 may issue one or more requests for response to participating sub-processing units. The request for response is preferably in the form of a network data packet that is capable of propagating through the network between the processor element PE0 to the other processor elements and sub-processing units. In particular, a request for response may be issued by the processor element PE0 to processor element PE2 by traveling over the data bus 704A, through the bridge 706A, over the bus 708A, through the bridge 710A, over the data bus 712, through the bridge 710B, over the data bus 708B, through the bridge 706C, over the data bus 704C, to the processor element PE2. It is noted that this data path of the request for response from the processor element PE0 to the processor element PE2 may be referred to as an uplink data path.

The requests for response are capable of accumulating communications information (e.g., in the form of the latencies and bandwidths) associated with the communications interfaces encountered by the requests for response as they travel throughout the network. In the example above, with respect to the request for response traveling from the processor element PE0 to the processor element PE2, the request for response preferably accumulates the respective latency and bandwidth parameters associated with the data buses 704A, 708A, 712, 708B, and 704C. More particularly, as illustrated, the request for response accumulates (at 720) the latency and bandwidth parameters of 1 and 10 associated with data bus 704A at least by the time that the request for response leaves the bridge 706A. Thereafter, the request for response accumulates (at 722) the latency and bandwidth parameters of 5 and 3 associated with the data bus 708A at least by the time the request for response leaves the bridge 710A. The accumulation 722 therefore includes a latency and bandwidth pair of 1 and 10 and latency and bandwidth pair of 5 and 3. Further, the request for response accumulates (at 724) the latency and bandwidth parameters of 20 and 1 associated with data bus 712 at least by the time that the request for response passes through the bridge 710B. The accumulation 724 at that stage therefore includes latency and bandwidth pairs of 1, 10; 5, 3; and 20, 1. Thereafter, the request for response accumulates (at 726) the latency and bandwidth parameters of 4 and 4 associated with data bus 708B. Thus, the accumulation 726 includes latency and bandwidth pairs of 1, 10; 5, 3; 20, 1; and 4, 4. Finally, the request for response accumulates (at 728) the latency and bandwidth parameters of 2 and 8 associated with the data bus 704C. The accumulation 728 thus includes latency and bandwidth pairs of 1, 10; 5, 3; 20, 1; 4, 4; and 2, 8.

In accordance with one or more aspects of the present invention, at least an estimation of the communications costs associated with re-allocating any processor tasks from one of the sub-processing units of the processor element PE0 to one or more of the sub-processing units of the processor element PE2 are computed from the communications information (e.g., the latency and bandwidth parameters) that was accumulated when the request for response traveled from the processor element PE0 to the processor element PE2 over the network.

As has been discussed hereinabove, the results of the processor tasks of the given sub-processing unit experiencing processing errors may be intended for use by one or more of the sub-processing units within the processor element PE0 or the results may be intended for use by one or more sub-processing units located in other processor elements, such as processor element PE1. As has also been discussed, the processing results or other such data of the one or more other sub-processing units may be intended to be used by the affected sub-processing unit, such as to effect the processor tasks thereof.

Assuming that the results of the processor tasks of the given sub-processing unit were intended for use in one or more of the sub-processing units within processor element PE0 (or vice versa), the accumulation 728, representing the communications costs of the communications interfaces between processor element PE0 and processor element PE2 would be substantially directly usable to determine the communications costs that would exist between the one or more sub-processing units within processor element PE0 to receive results from or provide results to the given sub-processing unit and the one or more participating sub-processing units within processor element PE2 to which the processor tasks may be re-allocated.

On the other hand, assuming that the results of the processor tasks of the given sub-processing unit within processor element PE0 were intended for use in one or more of the sub-processing units within, for example, the processor element PE1 (or vice versa), then further information concerning the communications interfaces of the network would be useful in determining the overall communications costs if the processor tasks were re-allocated to the processor element PE2. In this regard, the main processing unit of the processor element PE0 preferably issues one or more requests for response to the one or more sub-processing units intended to receive results from, or transmit results to, the given sub-processing unit. In this example, the main processing unit of processor element PE0 would issue a request for response to the processor element PE1 and/or the sub-processing units therein. This assumes that no previous opportunity existed to obtain the communications information from PE1. If however, PE0 and PE1 were communicating with one another previously (e.g., before an error is detected), then it might not be necessary for PE0 to issue a request for response to PE0. Assuming a request was needed, the accumulated communications information 730 obtained during the request's travel from processor element PE0 to processor element PE1 therefore includes latency and bandwidth pairs of 1, 10; 5, 3; and 2, 8.

The computation of the communications costs associated with re-allocating the processor tasks from the given sub-processing unit of processor element PE0 to one or more of the sub-processing units of process element PE2 would involve a comparison of the respective accumulations 728 and 730. In this example, the main processing unit of the processor element PE0 may execute a comparison of the respective latency and bandwidth pairs of each of, the accumulations 728 and 730 to obtain at least an estimate of the latency and bandwidth pairs that would be accumulated in an uplink path from the processor element PE1 to the processor element PE2. In particular, a side-by-side comparison of the latency and bandwidth pairs of the respective accumulations 728 and 730 reveal that the first two pairs are identical: 1, 10; and 5, 3. The next latency and bandwidth pair in each of the accumulations is different, 20, 1 in accumulation 728 and 2, 8 in accumulation 730. The estimated uplink data path accumulation from processor element PE1 to processor element PE2, therefore, is 2, 8 (from accumulation 730); 20, 1 (from accumulation 728); 4, 4 (from accumulation 728); and 2, 8 (from accumulation 728).

The communications costs of the uplink data paths from processor element PE1 to PE0, from processor element PE0 to PE2, and from processor element PE1 to PE2 may be computed from the respective accumulations 730, 728, and the estimated accumulation obtained from comparing accumulations 728 and 730. As to the communications cost of the uplink data path between processor element PE0 and PE1, the respective latency parameters are aggregated to obtain an overall latency of the uplink data path. This yields an aggregate uplink communication latency of 1+5+2=8. The bandwidth parameters of the uplink data path between processor elements PE0 and PE1 are evaluated to determine the lowest bandwidth. In this example, the lowest bandwidth of 3 is associated with data bus 708A. Thus, the lowest communications bandwidth for the uplink data path between processor elements PE0 and PE1 is 3.

These computations may also be applied to the uplink data paths between processor elements PE0 and PE2, and between processor elements PE1 and PE2. The aggregate latency and minimum bandwidth of the uplink data path between processor elements PE1 and PE2 may be of particular interest because if the processor tasks of the given sub-processing unit of processor element PE0 were re-allocated to processing element PE2, then the uplink data path between processor element PE1 (which is to receive results from, or transmit results to, the given sub-processing unit) and processor element PE2 may be of importance in meeting the communications requirements in order to meet the real-time, multi-media objectives of the overall processing system.

In accordance with one or more further aspects of the present invention, it may be desirable to compute communications costs associated with both uplink data paths and downlink data paths between the respective processor elements of interest. For example, if a determination is to be made as to whether the processor tasks of the given sub-processing unit of processor element PE0 should be re-allocated to processor element PE2, then both the uplink and downlink data paths should be considered as between processor element PE1 (which is to receive results from, or transmit results to the given sub-processing unit) and processor element PE2. The main processing unit of processor element PE0 may evaluate these uplink and downlink communications costs by receiving communications information (e.g., latency and bandwidth parameters) associated with both the uplink data paths and downlink data paths. In a preferred embodiment, the one or more responses issued by the participating sub-processing units (or processor elements) to the main processing unit of the initiating processor element (in this example, processor element PE0) are operative to accumulate further communications information concerning the latencies and bandwidths associated with the communications interfaces encountered by the responses as they travel to the main processing unit.

Reference is now made to FIG. 22, which illustrates a downlink data path from processor element PE2 to processor element PE0 over which a response issued by processor element PE2 travels. In a preferred embodiment, the response may also include the accumulation 728 that was obtained when the request for response was received by the processor element PE2. Thus, as the response travels from processor element PE2 to processor element PE0 over the downlink data path, the accumulations 750, 752, 754, 756, and 760 may include both the uplink accumulation 728 and the downlink accumulation. Thus, the accumulation 760, which is received by the processor element PE0 (and/or the main processing element thereof) contains both uplink and downlink data path latency and bandwidth information. The uplink data path accumulation includes latency and bandwidth pairs 1, 10; 5, 3; 20, 1; 4, 4; and 2, 8. The downlink data path accumulation includes latency and bandwidth pairs 2, 8; 4, 4; 20, 1; 5, 3; and 1, 10.

It is noted that in the examples discussed herein, the uplink and downlink data path accumulations are symmetric. In accordance with further aspects of the present invention, however, the uplink and downlink data path accumulations may not be symmetric, all depending on the particularities of the network.

Figure 23:
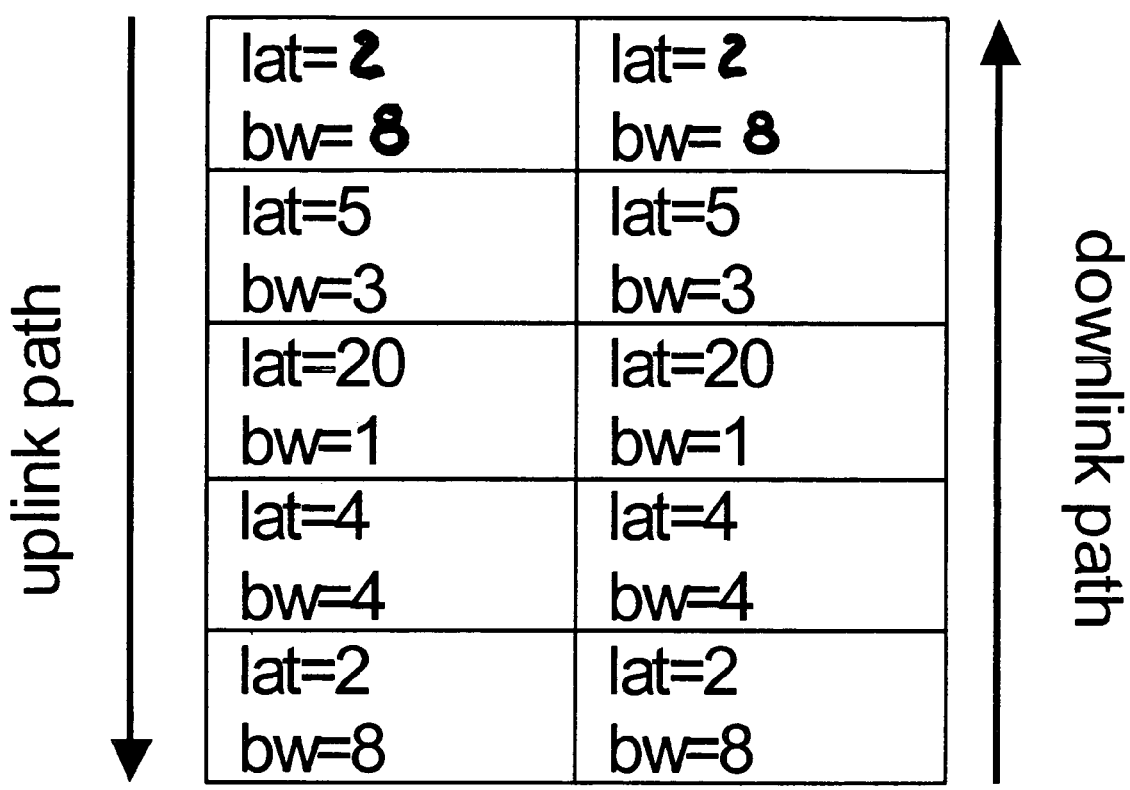
FIG. 23 is a block diagram of an accumulation of communication information obtained as a response travels trough the system of FIG. 22.

As discussed above, the main processing unit of the processor element PE0 is preferably capable of estimating the uplink and downlink data path accumulations as between one or more sub-processing units that are intended to receive results from, or transmit results to, the given sub-processing unit experiencing errors. The same approach that was discussed hereinabove as to the uplink data path example may be employed as to the downlink data path scenario. Reference is now made to FIG. 23, which illustrates an uplink data path accumulation and downlink data path accumulation with respect to processor element PE1 and PE2 that may be computed by processor element PE0. The main processing unit of the processor element PE0 preferably computes an aggregate uplink communication latency, an uplink data path bandwidth, an aggregate downlink communication latency, and a downlink data path bandwidth as between processor elements PE1 and PE2.

These communications costs are preferably utilized by the main processing unit of the processor element PE0 in determining whether the re-allocation of the processor tasks to processor element PE2 would meet the communications requirements for achieving real-time processing goals. In accordance with various aspects of the present invention, it is contemplated that the main processing unit of processor element PE0 would receive numerous responses from participating sub-processing units (and/or processor elements) throughout the system such that any number of options for re-allocating the processor tasks of the given sub-processing unit may be evaluated in a manner consistent with that discussed hereinabove.

In accordance with one or more further aspects of the present invention, one or more of the data busses 708A, 708B, 712, etc., may be capable of providing communications cost information to a given processor element, main processing unit, or sub-processing unit. Indeed, each bus may include a bus arbiter logic unit (not shown) that has access to communication cost information. When a request to send a packet (such as by a master data packet) is provided to the bus arbiter logic unit (which is normally done anyway), the arbiter may respond with the communications cost information associated with the bus. Thus, in this embodiment there would be no necessity for a central server to manage communication cost information.

It is noted that a given PE or sub-processing unit thereof may issue a reservation request to one or more of the arbiter units so that bandwidth may be reserved as between two or more PEs. In response to a reservation request, the bus arbiter unit may decrement the available bandwidth by the amount of the request to insure communications requirements between the requesting PE and the associated PE (or PEs) may be met. A reservation clear request issued to the bus arbiter unit may clear the reservation.

Although significant attention has been given to how communications costs may be evaluated based on information obtained through the use of requests for response and responses traveling throughout the network, it is also contemplated that the requests for response and/or the responses may include other types of information, such as is found in table 600 (FIG. 17) and table 600A (FIG. 19). For example, the participating sub-processing units issuing responses may also include performance information, availability information, cost information, and location information such that the main processing unit of the processor element PE0 may evaluate such information in making a determination as to the re-allocation of the processor tasks of the given sub-processing unit.

Advantageously, the re-allocation of the processor tasks of the affected sub-processing unit may be based on one or more of the performance capabilities and communications capabilities of the participating sub-processing units without the necessity of an administrative entity, which might have adverse effect on the speed with which such re-allocation occurs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, in a computer system having at least a processor and memory, the method comprising:
monitoring processor tasks and associated processor loads therefor that are allocated to be performed by respective participating sub-processing units associated with a main processing unit;
detecting whether a processing error has occurred in a given one of the sub-processing units;
issuing one or more requests for response from the main processing unit associated with the given sub-processing unit to one or more of the participating sub-processing units;
receiving one or more responses at the main processing unit from one or more of the participating sub-processing units;
re-allocating all of the processor tasks of the given sub-processing unit to one or more of the participating sub-processing units that responded to the requests for response based on the processor loads of the processor tasks of the given sub-processing unit and the processor loads of the participating sub-processing units;
performing at least one of: (i) shutting down, and (ii) re-booting the given sub-processing unit;
determining communications requirements, including at least one of communication bandwidth and communication latency, needed between the given sub-processing unit and the participating sub-processing units to share processing results with the given sub-processing unit;
accumulating communications information in one or more of the requests for response, the communications information being indicative of at least one of communications latencies and communications bandwidths associated with any communications interfaces encountered by the respective requests for response as they travel from the main processing unit to the one or more of the participating sub-processing units; and
selecting one or more of the participating sub-processing units for re-allocation of the processor tasks of the given sub-processing unit based on a comparison of the processor loads of the processor tasks of the given sub-processing unit, the respective processor loads for the participating sub-processing units issuing responses, the communications requirements, and the accumulated information.

2. The method of claim 1, further comprising: assigning the processor tasks among the sub-processing units such that at least one of the sub-processing units is substantially unloaded and available to receive some or all of the processor tasks from the given sub-processing unit.

3. The method of claim 2, further comprising commanding the at least one substantially unloaded sub-processing unit that is not scheduled to perform any processor tasks into a stand-by state.

4. The method of claim 1, further comprising:
computing at least an estimate of the communications costs that would exist between the one or more sub-processing units to share processing results with the given sub-processing unit and the one or more participating sub-processing units to which the processor tasks may be re-allocated based on the accumulated communications information;
wherein the selecting one or more of the participating sub-processing units for re-allocation of the processor tasks of the given sub-processing unit is further based on the estimate of the communications costs.

5. An apparatus, in a computer system having at least a processor and memory, the apparatus comprising:
a plurality of participating sub-processors, each operable to perform processor tasks; and
a main processor operable to:
(i) monitor the processor tasks and associated processor loads therefor that are allocated to be performed by the respective participating sub-processors;
(ii) detect whether a processing error has occurred in a given one of the sub-processors;
(iii) issue one or more requests for response from the main processor associated with the given sub-processors to one or more of the participating sub-processors;
(iv) receive one or more responses at the main processor from one or more of the participating sub-processors;
(v) re-allocate all of the processor tasks of the given sub-processors to one or more of the participating sub-processors that responded to the requests for response based on the processor loads of the processor tasks of the given sub-processors and the processor loads of the participating sub-processors;
(vi) at least one of issue a shut-down command and issue a re-boot command to the given sub-processors;
(vii) determine communications requirements, including at least one of communication bandwidth and communication latency, needed between the given sub-processor and the participating sub-processors to share processing results with the given sub processor;

(viii) accumulate communications information in one or more of the requests for response, the communications information being indicative of at least one of communications latencies and communications bandwidths associated with any communications interfaces encountered by the respective requests for response as they travel from the main processor to the one or more of the participating sub-processors; and (ix) select one or more of the participating sub-processors for re-allocation of the processor tasks of the given sub-processor based on a comparison of the processor loads of the processor tasks of the given sub-processor, the respective processor loads for the participating sub-processors issuing responses, the communications requirements, and the accumulated information.

6. The apparatus of claim 5, wherein the main processor is at least one of remotely located from or locally located with one or more of the sub-processors.

7. The apparatus of claim 5, wherein one or more of the sub-processors are remotely located from one another.

8. The apparatus of claim 5, wherein the sub-processors employ substantially heterogeneous computer architectures or a homogeneous computer architecture.

9. The apparatus of claim 5, wherein the main processor is further operable to assign the processor tasks among the sub-processors such that at least one of the sub-processors is substantially unloaded and available to receive some or all of the processor tasks from the given sub-processors.

10. The apparatus of claim 9, wherein the main processor is further operable to command the one or more unloaded sub-processors that are not scheduled to perform any processor tasks into a stand-by state.

* * * * *